United States Patent
Schaad et al.

(10) Patent No.: US 8,689,352 B2
(45) Date of Patent: Apr. 1, 2014

(54) DISTRIBUTED ACCESS CONTROL FOR DOCUMENT CENTRIC COLLABORATIONS

(75) Inventors: Andreas Schaad, Karlsruhe (DE); Mohammad Ashiqur Rahaman, Nice (FR)

(73) Assignee: SAP AG, Walldorf (DE)

(*) Notice: Subject to any disclaimer, the term of this patent is extended or adjusted under 35 U.S.C. 154(b) by 898 days.

(21) Appl. No.: 12/339,026

(22) Filed: Dec. 18, 2008

(65) Prior Publication Data
US 2010/0158254 A1 Jun. 24, 2010

(51) Int. Cl.
*H04L 29/06* (2006.01)

(52) U.S. Cl.
USPC .............................................. 726/28; 707/608

(58) Field of Classification Search
None
See application file for complete search history.

(56) References Cited

U.S. PATENT DOCUMENTS

| | | | | |
|---|---|---|---|---|
| 5,787,175 A * | 7/1998 | Carter | ........................... | 713/165 |
| 6,421,678 B2 * | 7/2002 | Smiga et al. | .................. | 707/608 |
| 7,099,885 B2 * | 8/2006 | Hellman et al. | ...................... | 1/1 |
| 7,475,242 B2 * | 1/2009 | Baird et al. | ..................... | 713/166 |
| 7,533,124 B2 * | 5/2009 | Hellman et al. | ....................... | 1/1 |
| 7,870,387 B1 * | 1/2011 | Bhargava et al. | ............. | 713/166 |
| 7,882,565 B2 * | 2/2011 | Collins et al. | ................... | 726/27 |
| 8,132,261 B1 * | 3/2012 | Simpson et al. | ................ | 726/27 |
| 2004/0062400 A1 * | 4/2004 | Sovio et al. | .................... | 380/286 |
| 2004/0205653 A1 * | 10/2004 | Hadfield et al. | .............. | 715/530 |
| 2005/0120199 A1 * | 6/2005 | Carter | ........................... | 713/150 |
| 2006/0167946 A1 * | 7/2006 | Hellman et al. | ........... | 707/104.1 |
| 2007/0250617 A1 * | 10/2007 | Kim et al. | ...................... | 709/223 |
| 2007/0255610 A1 * | 11/2007 | Schaad | ............................. | 705/9 |
| 2008/0059539 A1 * | 3/2008 | Chin et al. | ..................... | 707/203 |
| 2008/0263155 A1 * | 10/2008 | Bhogal et al. | .................. | 709/205 |
| 2009/0077625 A1 * | 3/2009 | Van Der Linden et al. | ....... | 726/1 |
| 2009/0129596 A1 * | 5/2009 | Chavez et al. | ................ | 380/277 |
| 2011/0161283 A1 * | 6/2011 | Henderson | .................... | 707/608 |

* cited by examiner

*Primary Examiner* — Michael R Vaughan
(74) *Attorney, Agent, or Firm* — Brake Hughes Bellermann LLP

(57) ABSTRACT

Document collaboration may be implemented by executing an access interest specification phase. The access interest specification phase may include receiving access requests from collaboration participants for access to a document instance, the access requests specified using a document schema of the document instance and referencing at least one schema portion for access to a corresponding document instance portion based thereon, determining a common access interest group of the collaboration participants, based on the access requests, access credentials of the collaboration participants, and on an access control policy specified in terms of the access credentials, and providing a control data block to the participants of the common access interest group including information for generating a common secret key that is common to the participants of the common access interest group. The document collaboration may further be implemented by executing a collaboration phase. The collaboration phase execution may include encrypting the document instance portion using the access control policy, and providing access to the document instance for access to the document instance portion by an accessing participant of the common access interest group, the access including decryption of the document instance portion using the common secret key.

17 Claims, 12 Drawing Sheets

DISTRIBUTED ACCESS CONTROL FOR DOCUMENT CENTRIC COLLABORATIONS

TECHNICAL FIELD

This description relates to collaborative document authoring and editing.

STATEMENT OF GOVERNMENT SUPPORT

Portions of the described subject matter were developed in conjunction with European Union Project IP R4eGov, FP6.

BACKGROUND

Many documents are authored and edited through the collaboration(s) of multiple persons and/or organizations. For example, a document may be created and stored in a central repository, from which other collaboration partners or participants may access the document for updates or other editing or alterations. In other examples, an author of a document may circulate an initial draft, which may then be updated and forwarded by each collaboration participant to another collaboration participant.

Although such collaboration techniques may be sufficient in some circumstances, it is also true that many circumstances exist in which such document collaborations may be improved when compared to the above (and other conventional) techniques. For example, distributed document collaborations may be desired in which multiple participants author documents simultaneously, or when no central repository exists (or is currently available for access), or when collaboration participants dynamically join/leave the collaboration. Still further, complications may occur when documents exist which include multiple different portions; and different ones of the collaboration participants are concerned with different ones of the document portions; or collaboration participants may only be able to exercise authority over selected portions of a complex document. In these and other collaboration scenarios, moreover, document security (e.g., authenticity, confidentiality, and integrity) may be an important concern. It may be difficult to address these and other concerns related to distributed document collaborations in a satisfactory manner.

SUMMARY

According to one general aspect, a computer system may include instructions stored on a computer-readable medium, and the computer system may include an access interest manager configured to provide an expression of access interest of a collaboration participant with respect to a document portion, the access interest specified in terms of an access primitive describing a type of access requested for the document portion, a document access pattern manager configured to receive access requests from a plurality of collaboration participants including the collaboration participant, each access request including at least one access primitive, a document authorization manager configured to receive the expression of access interest and to associate the collaboration participant with a common access interest group of the collaboration participants, based on the access requests and on an access control policy specified in terms of access credentials of the common access interest group participants, a document edition manager configured to update the document portion based on the access primitive, and a key manager configured to implement a common secret key that is common to the common access interest group for encrypting/decrypting the document portion.

According to another general aspect, a computer program product for executing process models may be tangibly embodied on a computer-readable medium and may include executable code that, when executed, is configured to cause at least one data processing apparatus to receive access requests from collaboration participants for access to a document instance, the access requests specified using a document schema of the document instance and referencing at least one schema portion for access to a corresponding document instance portion based thereon, determine a common access interest group of the collaboration participants, based on the access requests, access credentials of the collaboration participants, and on an access control policy specified in terms of the access credentials, provide a control data block to the participants of the common access interest group including information for generating a common secret key that is common to the participants of the common access interest group, encrypt the document instance portion using the access control policy, and provide access to the document instance for access to the document instance portion by an accessing participant of the common access interest group, the access including decryption of the document instance portion using the common secret key.

According to another general aspect, a computer-implemented method of document collaboration may include executing an access interest specification phase, which may include receiving access requests from collaboration participants for access to a document instance, the access requests specified using a document schema of the document instance and referencing at least one schema portion for access to a corresponding document instance portion based thereon, determining a common access interest group of the collaboration participants, based on the access requests, access credentials of the collaboration participants, and on an access control policy specified in terms of the access credentials, and providing a control data block to the participants of the common access interest group including information for generating a common secret key that is common to the participants of the common access interest group. The computer-implemented method may further include executing a collaboration phase, including encrypting the document instance portion using the access control policy, and providing access to the document instance for access to the document instance portion by an accessing participant of the common access interest group, the access including decryption of the document instance portion using the common secret key.

The details of one or more implementations are set forth in the accompanying drawings and the description below. Other features will be apparent from the description and drawings, and from the claims.

DETAILED DESCRIPTION

Figure 1:
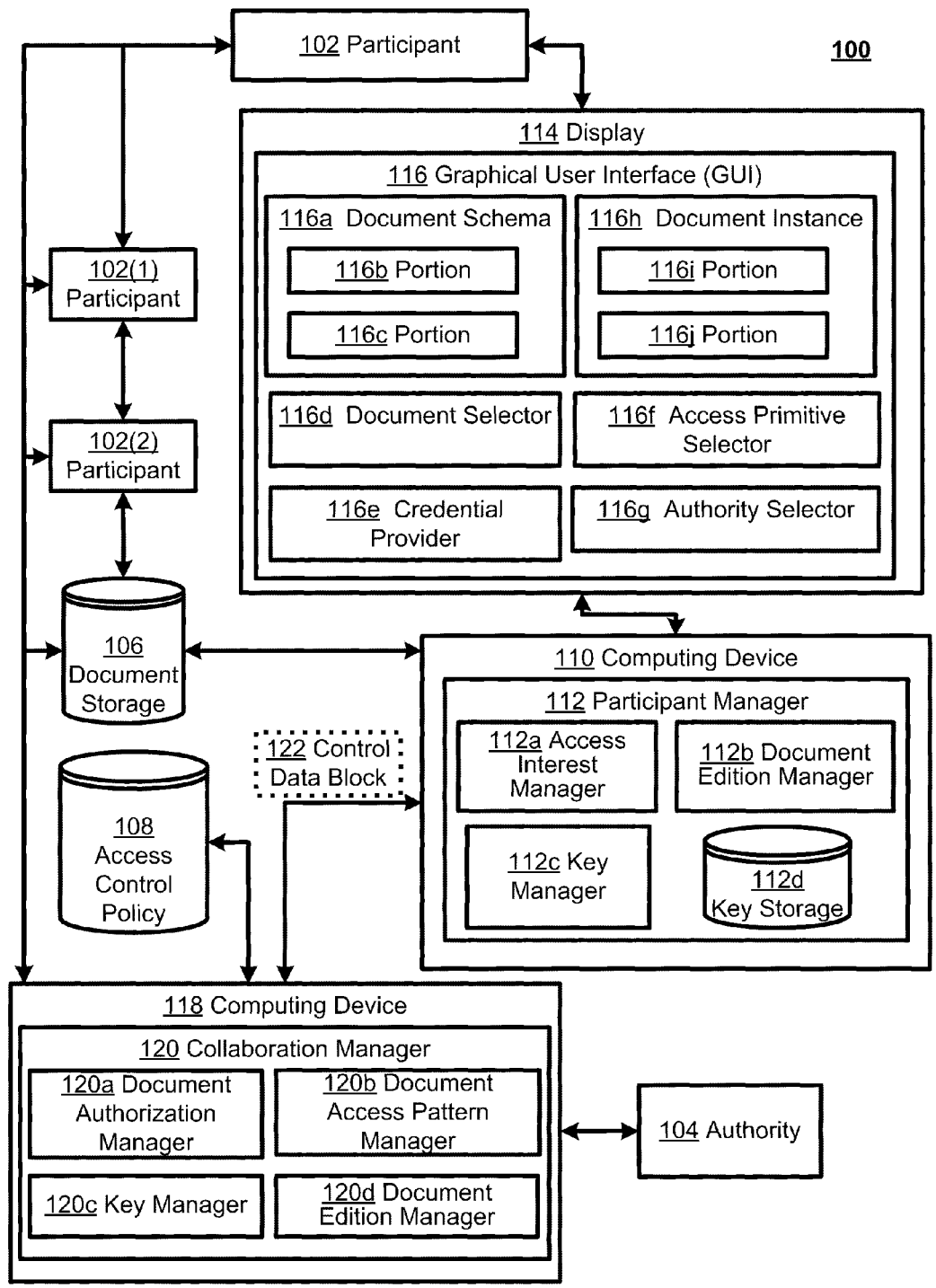
FIG. 1 is a block diagram of a system for providing distributed access control for document centric collaborations.

FIG. 1 is a block diagram of a system 100 for providing distributed access control for document centric collaborations. In the example of FIG. 1, document collaborations may occur in a secure and scalable fashion, without requiring a central access and/or storage point(s) for the documents in question. That is, control over access to the documents may be implemented in a distributed fashion, e.g., enforced by the collaborating participants themselves. In this way, for example, multiple participants may collaborate to create and edit documents, and, moreover, may do so in a fine-grained manner that allows each participant to access/control only those portions of the documents which are necessary/authorized for the participant(s) in question. In so doing, the system 100 of FIG. 1 may take advantage of common document schema(s) of the documents in question, and may take advantage of common interests or access patterns of the participants in granting access/control over the documents in question. Thus, access control specification may be asynchronously decoupled from its enforcement.

In FIG. 1, participants 102, 102(1), and 102(2) represent "n" participants who are collaborating together with an authority 104 to create/edit documents within document storage 106. For example, participants 102, 102(1), and 102(2) may represent multiple persons within a department of an enterprise, or may represent multiple organizations communicating with one another, or may represent virtually any two entities which wish to collaborate on one or more of the documents within the document storage 106. The authority 104 conceptually represents at least an initial authorization point for determining access controls on one or more of the participants 102, 102(1), and 102(2). In this regard, for example, the authority 104 may represent an initial author or creator of some or all of a particular document, or may represent an entity entrusted (e.g., delegated) to enforce access controls on a previously-created document.

More generally, as may be appreciated from the distributed nature of the system 100 as described herein, the authority 104 may itself be considered to be (part of) one of the participants 102, 102(1), and 102(2) . . . 102(n), and, conversely, it may be appreciated that one of the participants 102, 102(1), and 102(2) may act as an additional or alternative authority to the authority 104. That is, any member of the system 100 may act, at a given time, as one or both of a participant and/or an authority, with respect to a given document or portion thereof. Thus, no single entity is required to serve as a central access point (and, consequently, a single point of failure) for the documents within the document storage 106 (or as a central enforcement point for enforcing access control policies). Further in this regard, it may be appreciated that the documents themselves, although shown in the single document storage 106, may actually be stored, circulated, and/or accessed in a distributed fashion, using multiple storage techniques and/or locations.

An access control policy 108 is illustrated that represents rules for permitting (or not permitting) access of one or more of the participants 102, 102(1), and 102(2) to the documents (or portions thereof) within the document storage 106. As described herein, the access control policy 108 may include rules that are specified in one or more various ways to describe possible accesses of the participants 102, 102(1), and 102(2), e.g., based on credentials of these participants and other information as described herein. Then, actual enforcement of the specified access control policy may occur in a distributed fashion, by way of communication between the participants 102, 102(1), and 102(2) and the authority 104. Thus, as already referenced, specification of the access control policy 108 may be decoupled from its (distributed) enforcement.

The participant 102 may use a computing device 110 to execute a participant manager 112, as shown. The computing device 102 may be virtually any conventional computing device (such as a desktop or laptop computer) that may be programmed to implement the participant manager 112 and associated techniques and algorithms. The computing device 110 may execute the participant manager 112 locally or remotely (e.g., over the Internet or other network).

Generally speaking, the participant manager 112 may be responsible for allowing the participant 102 to indicate parameters associated with a desired document collaboration (e.g., editing of an existing document), and for allowing the participant 102 to actually execute any and all allowed features of such a collaboration. In so doing, a display 114 of the computing device 110 (which may be virtually any conventional display) may be used to provide a graphical user interface (GUI) 116 to allow the participant 102 to specify the relevant collaboration parameters, and to execute the desired/allowed collaboration(s), as described in more detail herein.

Meanwhile, a computing device 118 may be used by the authority 104 to execute a collaboration manager 120, as shown. As described herein, the collaboration manager 120 may be used to set some or all of the access control policy 108, and to provide information, e.g., control data block 122, that may be used by the participant 102 to enforce the access control policy 108 in a distributed fashion.

More specifically, for example, the collaboration manager 120 may be used to identify/define/modify groups of the participants 102, 102(1), and 102(2) having common access rights with respect to some or all of the documents (or some or all portions thereof) within the document storage 106, and to set security parameters for use by the participants 102, 102(1), and 102(2) (and/or defined groups thereof) and associated with maintaining, e.g., an authenticity, confidentiality, or integrity of the documents in question. Other duties of the collaboration manager 120 may include suitable delegation of access decisions to one or more of the participants 102, 102(1), and 102(2), if needed (e.g., if the authority 104 is to go off-line or otherwise become unavailable).

They system 100 of FIG. 1 thus provides a distributed and fine grained access control framework for document collaborations. In the following examples, the system 100 is discussed as providing such document collaborations for eXtensible Markup Language (XML) documents. However, it will be appreciated that the system 100 may be implemented in virtually any document collaboration scenario, particularly those where the documents in question may be developed or instantiated from a common document schema, such as may occur in the example of XML documents.

The referenced framework addresses the authenticity, confidentiality, integrity, and traceability (e.g., non-repudiation) of circulated documents and their updates, using cryptographic/key-based enforcement of credential-based access control policy 108 (e.g., encryption/decryption of document portions executed by the participants 102, 102(1), 102(2), and the authority 104). In general, the use of public/private key pairs for use in encryption/decryption and other security concerns is well known, and implementations of such techniques are not described here in detail, except as may be useful in understanding related aspects of the described embodiments.

In FIG. 1, a decentralized key management scheme may be used to support distributed (e.g., client-based) access enforcement. That is, the framework may be distributed in that each participant 102, 102(1), 102(2), 102(n) can enforce and verify security properties without relying on a single/central authorization entity (since, e.g., the authority 104 may delegate some or all of its authority to one of the participants 102, 102(1), 102(2), 102(n)). It is fine-grained in that it supports specification of access control policies on an individual element level, e.g., with respect to a portion(s) of the document(s). As referenced herein, such specification of fine-grained access patterns over XML documents and their elements/portions may be implemented according to the interests of the involved participants (e.g., by grouping the participants accordingly).

Examples of documents that may be the subject of such document collaborations are readily apparent, and may include, e.g., engineering documents, complex purchase orders, legal documents, contracts, or programming code. Such documents may share one or more of a set of properties including, e.g., composite/complex/nested XML structures with different owners of the different document parts, and different stakeholders (not the owners) that may wish to access individual elements in a distributed system context with no single/central authority and with common access patterns for a group of participants. A specific example of such a document is discussed in detail herein, i.e., a European Arrest Warrant (EAW), which may contain all the information about a criminal investigation that may eventually lead to a successful arrest as a result of a joint criminal investigation over organizational and system boundaries. Many different parties may be involved in the exchange of (and joint collaboration on) such a document, even though no party is likely to have access to all the portions of the (e.g., EAW) document.

An example operation(s) of the system 100 may be assumed to begin at a point when a document of the document storage 106, such as the EAW document just referenced, is about to be created and/or distributed/edited. A two-phase operation may occur in which an initial interest specification phase is used to identify which ones of the participants 102, 102(1), 102(2) are interested in collaborating with respect to a particular document or portion thereof; to determine their respective access interests (e.g., whether they wish to view, append, delete, or rename one or more document portions); and to define/determine these access interests relative to defined groups of the participants 102, 102(1), 102(2). In a second phase, actual document collaboration may be executed, based on the determined interest specification and participant group(s) of the first phase, in which the document portion(s) is/are encrypted for distribution and ultimately accessed and modified by one or more of the participants 102, 102(1), 102(2). Other aspects of these two phases, and other operations of the system 100, are described herein.

In FIG. 1, the graphical user interface 116 may be used by the participant 102 to execute the participant role in these two phases of operation. Of course, it should be appreciated that the participants 102(1) and 102(2), like the participant 102, also may implement (locally or remotely) the participant manager 112 (including the GUI 116) and/or some or all of the collaboration manager 120, though this is not explicitly shown in FIG. 1 for the sake of clarity and brevity.

In FIG. 1, it is assumed that because, e.g., the document(s) may be created by multiple participants/authorities, that the document(s) may be created according to a common schema or template (which also may be stored in the document storage 106). Consequently, such a schema may be used to specify a desired document and thereby execute the first or initial phase referenced above, i.e., in which access interest specification occurs.

For example, as shown, the GUI 116 may include a view 116a for a document schema that includes identification/illustration of a portion 116b and a portion 116c. The participant 102 in this example may use a document selector 116d to select and view the document schema 116a as including the portions 116, 116c. An example of such a document schema is illustrated and discussed below with respect to an example EAW shown in FIG. 10A. In general, however, it may be appreciated that the document schema 116a may include a first portion 116b associated with a first level or type of security (e.g., encryption) that is enforced with respect to a first group of collaboration participants, as well as a second portion 116c associated with a second level or type of security that is enforced with respect to a second group of collaboration participants. For example, it may ultimately occur that the participants 102 and 102(1) form a group associated with credentials which allow a certain level or type of access to the first portion 116b, while the participants 102 and 102(2) form a group associated with credentials which allow a certain level or type of access to the second portion 116c.

In practice, then, the participant 102 may initially select the document schema 116a using the document selector 116d, which may include, e.g., a search engine configured to search the document storage 106 based on entered search terms. In other implementations, the document schema may be "pushed" to the participant 102, e.g., by email or other messaging scheme, in which case, for example, the document selector 116d may simply allow the participant to select the document schema 116a from among a list of available schemas (e.g., by "point and click" with respect to such a list).

The participant 102 also may use the credential provider 116e to provide its security/access credentials. Although the credential provider 116e is illustrated in FIG. 1 as an explicit selectable button/icon in the GUI 116, it may be appreciated that in many implementations, the credentials may be detected/transmitted or otherwise determined automatically, and included or provided with the request for document access without requiring explicit inclusion or specification by the participant 102 in question.

In these and other implementations, such credentials may be used as the basis to decide which participant will get what access to which part of a document associated with the document schema 116a. Such credentials may be assumed to provide sufficient information to determine whether it is safe to unconditionally disclose a piece of information to a particular participant, thereby putting that participant into control for any further dissemination. If such an unconditional disclosure is not available, such as when, for example, some part of a document should only be accessed on a particular participant's system, or in a particular location, then access decisions may proceed based on trusted elements, such as through the deployment of tamper-resistant hardware and its embedding into participant's system.

The credentials used will determine the access control models that can be actually implemented in the context of FIG. 1. The credentials used might, for instance, describe the identity of participants 102, 102(1), 102(2), 102(n). In applications involving the collaboration of several organizations, credentials may describe organization or group membership, roles, clearance level, or possibly trust levels. In the example implementations described herein, the credentials may combine such information together with a public key of the participant in question, either through the signature of a certificate by an appropriate authority or through secured exchanges between trusted modules. Then, in this approach, the access control authority 104 (for instance, the document owner) may determine which access control rules apply to which participant based on the fulfillment of a set of credential-related conditions. Such access control rules may be authorization related, thereby describing the granting of access rights over parts of a document, but also may include or relate to more complex descriptions (e.g., involving access prohibitions).

Further when requesting document access for collaboration, the participant 102 may specify one or more access primitives expressing the type or extent of access desired with respect to each portion 116b, 116c. For example, an access primitive selector 116f may be used for this purpose, as shown in FIG. 1. Access primitives may include, for example, operations including view, delete, append, or rename, as well as other operations which may be extensions or combinations of these, such as copy or move. For example, the participant 102 may wish simply to view the portion 116b, but may wish to delete the portion 116c, and the access primitive selector 116f may be used to provide specify such desired operations.

Further in the GUI 116, an authority selector 116g represents the possibility of choosing an authority for gaining access to a desired instance of the document schema 116a, such as, for example, the authority 104. For example, the participant 102 may use the authority selector 116g to select an original author/creator or other owner of the document (schema) in question, or to select a separate authority with delegated authority for the document (schema). In the latter case, the separate authority may be closer and/or more available on a network, and therefore preferable, or may have more detailed knowledge about the particular participant 102 and/or the document schema 116a. In some implementations, search techniques may be employed to determine a particular authority, or a list of possible authorities may be provided for selection therefrom. Thus with the credential provider 116e, the authority selector 116g may be an explicit GUI element, or may be implemented automatically by the participant manager 112 without direct input or intervention from the participant 102.

From the participant's point of view, then, desired access (and related) information may be expressed using the GUI 116 (thus relating to the first phase of access interest specification as referenced above and described in detail herein) in order to obtain a desired instance 116h of the document schema 116a. For example, as described below, the participant 102 may express a desire to obtain certain access rights with respect to (portions of) the document schema for an EAW as shown in FIG. 10A, below, and, if approved, may ultimately obtain the desired instance 116h (such as the EAW instance of FIG. 10B, below) for (allowed) modification of the portion instances 116i and 116j (thus relating to the second phase of actual document collaboration, as also referenced above and described in more detail herein). As also described herein, the providing of the document instance 116h may include varying levels and types of encryption (and may thus require initial decryption for the participant 102 to proceed), and, likewise, subsequent completion of any desired modifications may necessitate (re-)encryption of the modified instance portions 116i, 116j.

The collaboration manager 120 and the participant manager 112 may execute the referenced two-phase distributed document collaboration protocol in the following general manner, with additional example details provided below. First, as just described, the collaboration manager 120 initiates the interest specification phase as the first of the two phases, in which the collaboration manager 120 may collect a plurality of participant requests for varying types of access to one or more documents or document portions. For example, all of the participants 102, 102(1), 102(2) . . . 102(n) may express access interest with respect to the document schema 116a (or other document schemas, although only the single document schema 116a is illustrated in FIG. 1, for the sake of brevity).

In the case of the participant manager 112, an access interest manager 112a may be responsible for providing and interacting with the GUI 116 and other sources of information to obtain access interest parameters, including, e.g., relevant access primitives and associated participant credentials, and may then be responsible for forwarding such information to the collaboration manager 120. Although not illustrated explicitly in FIG. 1, similar comments may apply to other participants 102(1), 102(2), 102(n).

The collaboration manager 120 may receive these expressions of access interest and may proceed with preparing to provide (or not provide) the ability to enforce desired access control to the participants in question. For example, a document authorization manager 120a may be responsible for receiving all of the expressions/requests and determining groups of participants having common access interests. Examples of such operations are described below, and in particular with respect to FIG. 8. In general, though, the document authorization manager 120a may determine that some groups or subsets of collaboration participants may share the same or sufficiently-similar credentials, and also may share the same or sufficiently-similar access rights.

For example, the participant 102 may have credentials with a first security credential and may wish merely to view portion 116b (i.e., instance portion 116i). Such access rights/operations may be the same for the participant 102(1), so that these two participants may be defined as a first common access interest group. Meanwhile, the participant 102 having the credentials with the first security credentiallso may wish to rename portion 116c (i.e., instance portion 116j). Such access rights/operations may be the same for the participant 102(2), so that these two participants may be defined as a second common access interest group. Many such groups may be formed, which may be specific to one or more documents or document portions, and which may reflect common interests and rights of groups of participants involved in the document collaboration.

Techniques and advantages associated with formation of such common access interest groups are provided in detail, herein. For example, once such groups are defined, the relevant access may be granted on a group-by-group basis, which significantly reduces overhead associated with encrypting (and decrypting) the documents and document portions for transmission, and thereby increases the scalability of the solution. Somewhat similarly, such groupings allow for the provision of information that is relevant to the collaboration in an efficient, scalable manner.

In particular, as described in detail herein, control data block 122 may ultimately be generated for use in the document collaboration, and may include encryption/decryption information (such as may be used by the participant(s) to generate a secret decryption key), and/or may include access delegation decisions authorizing one or more participants to act as an authority in present or future collaborations, and/or may include information used in managing membership in the common access interest groups (such as a new or additional participant and/or a removal or departure of a participant.) In FIG. 1, the control data block 122 may be determined by a key manager 120c that is in charge of determining and/or storing public or secret encryption keys, as well as by a document access pattern manager 120b in charge of, e.g., receiving the specified access primitives and determining document access based thereon. Determination of, and examples of, the control data block 122 are provided in detail herein.

Once the access interest specification phase has completed, the collaboration phase may begin. In this phase, a document edition manager 112b on the participant side and a document edition manager 120d on the authority side may be used to implement the actual access on the document in question. In particular, the document edition manager 120d may be responsible for encrypting (individually, if necessary) the portions 116i, 116j according to information obtained in the first (access interest specification) phase, and in conjunction with a key manager 120c.

For example, such encryption may be implemented on a portion-by-portion basis, with respect to the determined common access interest groups and their associated credentials, the access control policy 108, and their requested access rights (e.g., expressed as access primitives). For example, different versions of the control data block 122 may be distributed as needed to each participant group, and then used by each participant of each participant group to compute a common secret key (i.e., common to its participant group) for use in decrypting allowable portions (and for subsequently re-encrypting the modified versions of these portions). In this regard, a key manager 112c and associated key storage 112d may be used by the participant manager 112 to engage in key-based security as described herein, including generating/storing the common secret key for use in encrypting/decrypting/re-encrypting documents being shared by the common access interest groups referenced above.

Figure 2:
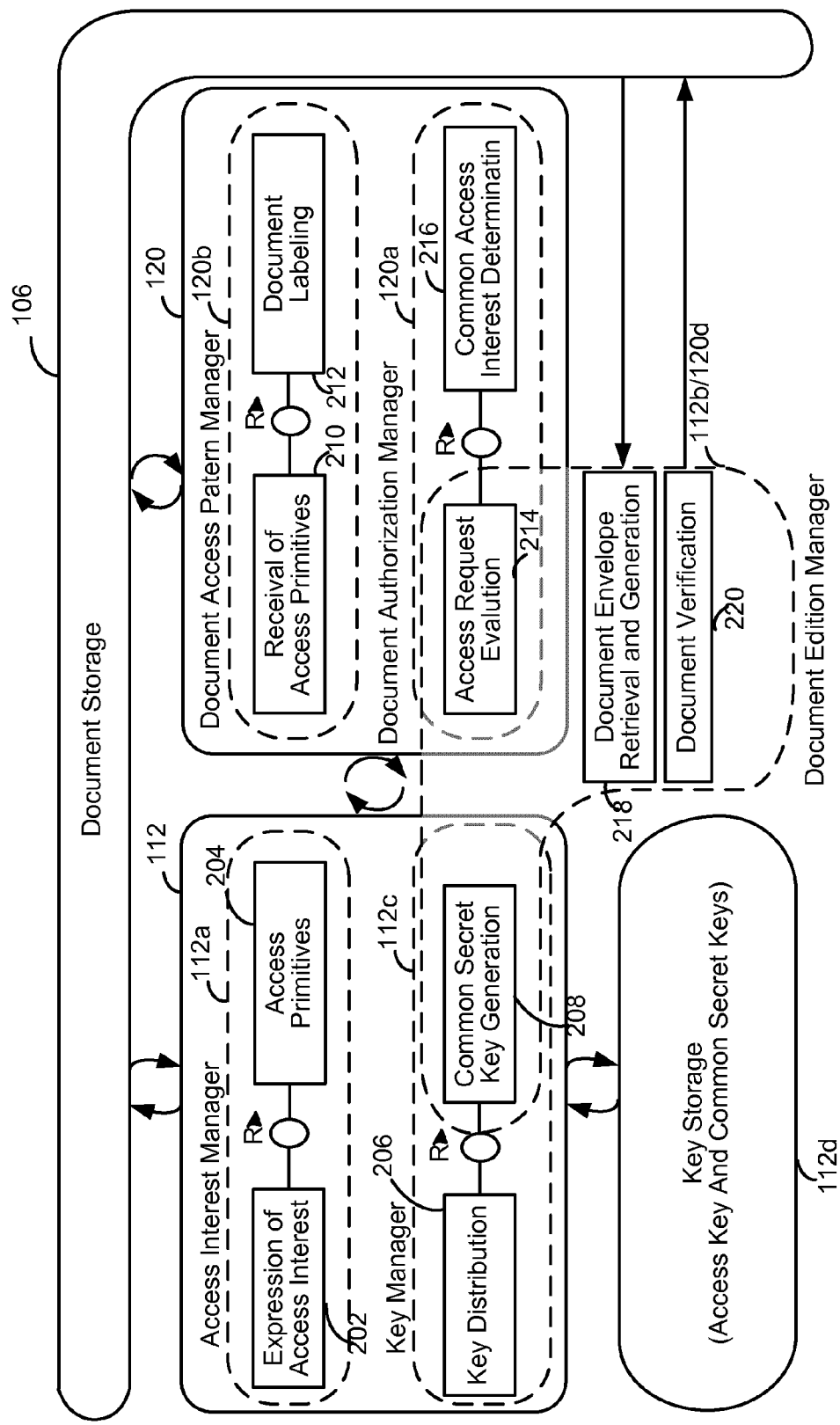
FIG. 2 is a block diagram of example architectural elements used in the system of FIG. 1.

FIG. 2 is a block diagram of example architectural elements used in the system of FIG. 1. FIG. 2 provides a more specific implementation of FIG. 1, including example elements that are described with greater detail than in FIG. 1. Still further detail is provided below with regard to FIGS. 4-12, e.g., regarding techniques for the identification of desired document portions for access thereto, techniques for the determination and dynamic updating of common access interest groups, techniques for the use of a document envelope to provide relevant security metadata, and implementation details for the decentralized key management scheme.

In FIG. 2, the access interest manager 112a of the participant manager 112 is illustrated as including a module 202 for expression of access interest, as well as a module 204 for designating access primitives. As may be appreciated from FIG. 1, the module 202 may be associated with (e.g., generate GUI icons and receive input therefrom) allowing the participant 102 to express interest regarding particular document portions, including providing the document schema 116a and the document selector 116d, as well as determining credentials of the participant 102, perhaps using the credential provider 116e. Similarly, the module 204 may be associated with determining access primitives (e.g., view, append, delete, or rename) desired by the participant 102, such as may be expressed using the access primitive selector 116f of the GUI 116 of FIG. 1.

Further in FIG. 2, the key manager 112c is illustrated as including a module 206 for key distribution, which may be configured, for example, to track the various public and private keys stored in key storage 112d. A module 208 may be configured for generation of the common secret key that is common to all members of a given common interest access group of which the participant 102 is a member. More generally, multiple types of keys may be used for different purposes in the systems of FIGS. 1 and 2. For example, a participant key pair may be associated with each participant (e.g., the participant 102) to associate that participant with related credentials. Access keys may be associated with each access primitive and may be used to identify desired types of access of a participant. As a final example, a common secret key, as already discussed, may be associated with each common access interest group (e.g., may be shared by each member of such a group) and used by the group to execute actual encryption/decryption/re-encryption of document portions, as permitted by their respective credentials relative thereto, and relative to the desired access primitives. In FIG. 2, the key storage 112d is illustrated as showing the access key(s) and common secret key(s) of the participant 102.

Meanwhile, in the collaboration manager 120, the document access pattern manager 120b may include a module 210 for receiving the specified access primitives, along with a module 212 associated with, e.g., authoring documents and including labels (which may be, e.g., simple integer values) with one or more portions to assist in identifying/differentiating such document portions, and, e.g., associating them with potentially allowable access primitives. The document authorization manager 120a includes a module 214 for performing access request evaluation for access requests received during the expression of access interest phase of operation, and a module 216 associated with determining common access interests to form associated groups of participants, which will each share a common secret key.

FIG. 1 illustrates the inclusion of a document edition manager 112b in the participant manager 112 and a document edition manager 120d in the collaboration manager 120. That is, as should be apparent, both the participant manager 112 and the collaboration manager 120 may be involved in the second, collaboration phase of the document collaboration techniques described herein, and may thus have similar and overlapping functionality to do so.

For example, a module 218 for document envelope retrieval and generation may be used to provide and/or interpret a document envelope attached to the document in question for, e.g., including security metadata and content updates related to the document. The use of such a document envelope is described in more detail, below. In general, though, the envelope may contain content updates sent around by participants as they collaborate with one another during the collaboration phase, and may be used to protect the document confidentiality and integrity according to the authority's access control policies. Only a participant with the knowledge of the common secret key can access the received envelope and verify that the updates performed are a result of a legitimate access as captured in that block. Further, just like document authorization, the protection of the document part is independently handled by the participants in the collaboration.

Somewhat similarly, a module 220 may be used to verify aspects of the document in question (e.g., verify authenticity, confidentiality, or integrity of the document). From the point of view of the collaboration manager 120, the document edition manager 120d may include and utilize the access request evaluation module 214. That is, the module 214 is used as described above during the access interest specification phase, and also may be used during the collaboration phase to evaluate actual requests for collaboration from, e.g., the participant manager 112. Conversely, on the side of the participant manager 112, the document edition manager 112b may include the module 208 for generation of the common secret key to be used in decrypting the received document portions (e.g., in using the control data block 122 in the document envelope to generate the common secret key) with the document verification module 220.

Thus, FIG. 2 illustrates a more detailed and comprehensive architecture for the system of FIG. 1. However, it may be appreciated that not all portions of this architecture are always necessary in each implementation. For example, a computing device 110 as in FIG. 1 may implement only the participant manager 112, while the computing device 118 may implement only the collaboration manager 120. For example, in the latter case, the authority 104 may only be interested in authoring documents and therefore may not need some or all of the functionality of the participant manager 112. In other examples, both managers 112, 120 may be implemented on (or accessed by) a single computing device and/or network. For example, such a computing device may allow operation of both authoring and sharing of documents using the described techniques, and may allow a single entity to act as a participant in some situations, as a group manager (e.g., adding or subtracting group members), as an authority in other situations, and as a delegated authority in other situations.

Figure 3:
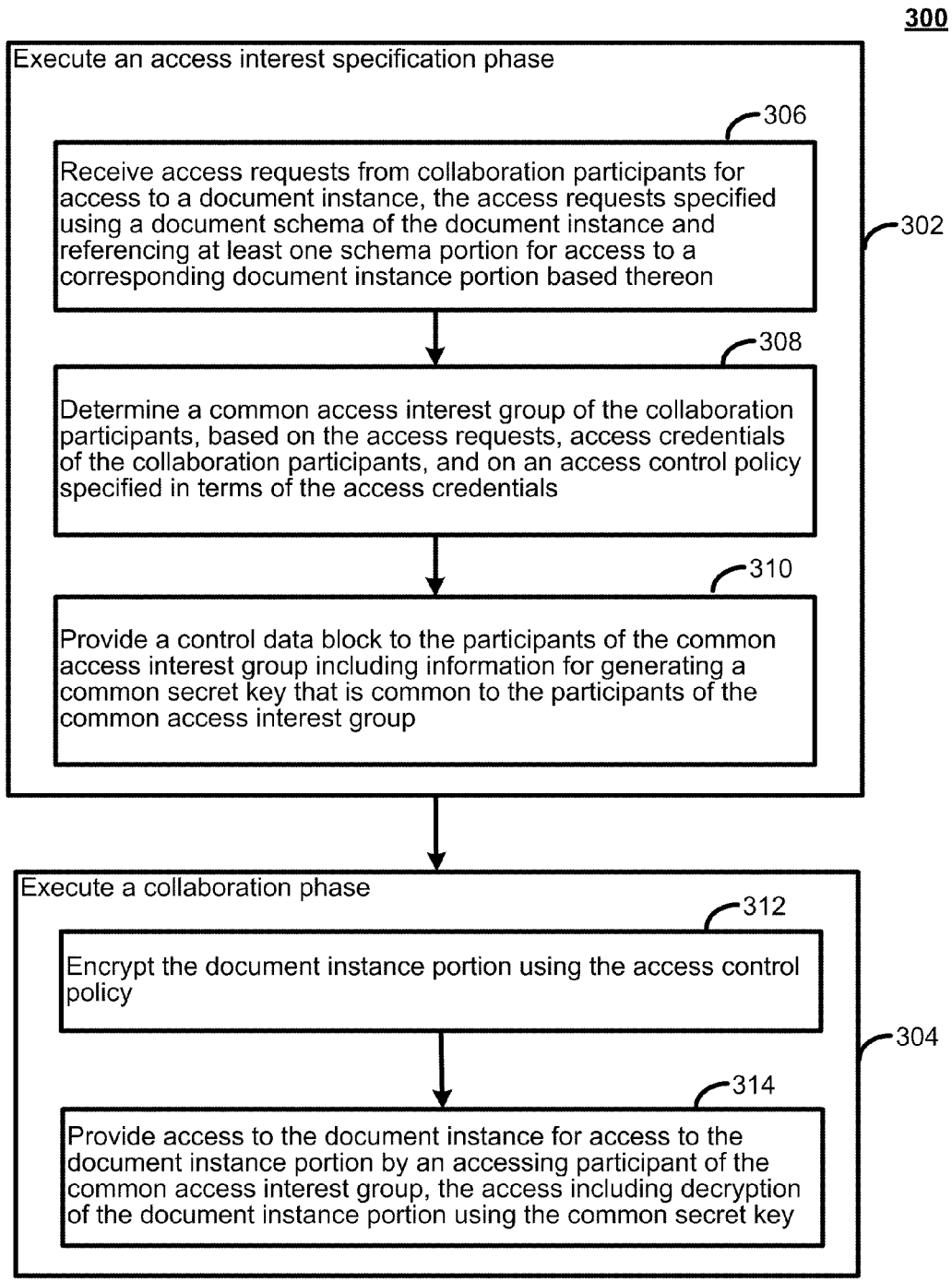
FIG. 3 is a flowchart illustrating example operations of the system of FIG. 1.

FIG. 3 is a flowchart 300 illustrating example operations of the system of FIG. 1. In FIG. 3, an access interest specification phase is executed (302). For example, the collaboration manager 120 may communicate with one or more participant managers 112 of one or more participants 102, 102(1), 102(2) to execute the access interest specification phase. Then, a collaboration phase may be executed (304). For example, the one or more participant managers 112 may interact with one another and/or with the collaboration manager 120 to collaborate on the authoring or editing of a document in a secure, scalable fashion.

In the access interest specification phase (302), access requests may be received from collaboration participants for access to a document instance, the access requests specified using a document schema of the document instance and referencing at least one schema portion for access to a corresponding document instance portion based thereon (206). For example, the document authorization manager 120a may receive these access requests, specified in terms of the document schema 116a and at least one of the portions 116b, 116c, and with reference to the document instance 116h and one of the instance portions 116i, 116j. As described, the access requests may include specification of access primitives (e.g., entered using the access primitive selector 116f) specifying the type of access desired (e.g., view, delete, append, or rename).

A common access interest group of the collaboration participants may be determined, based on the access requests, access credentials of the collaboration participants, and on an access control policy specified in terms of the access credentials (208). For example, the document authorization manager 120a may use the module 214 for access request evaluation and then the module 216 for the common access interest determination, as referenced herein.

A control data block may be provided to the participants of the common access interest group including information for generating a common secret key that is common to the participants of the common access interest group (310). For example, the module 218 of the document edition manager 120d may provide the control data block 122 in an appropriate document envelope associated with the document instance in question.

In the collaboration phase (304), the document instance portion may be encrypted using the access control policy (312). For example, the document edition manager 120d may use the module 220 to encrypt the requested document instance, including the instance portion in question, based at least on the access credentials of the participant 102 and the specified access primitives of the access request. Thus, it should be apparent that different instance portions of the document may be encrypted differently, since each portion may be the subject of a different (type of) access request from one or more participants, each of which may belong to multiple common access interest groups. Consequently, for example, the control data block 122 may include multiple sets or blocks of information that may be used, e.g., to generate whatever common secret key is necessary/allowed by the receiving participant.

Finally in FIG. 3, access to the document instance for access to the document instance portion by an accessing participant of the common access interest group may be provided, the access including decryption of the document instance portion using the common secret key (314). For example, the document edition manager 112b may be provided with all the information needed to generate the relevant common secret key, decrypt the specified instance portion to the extent needed/allowed, perform whatever access is needed/allowed as specified by the access primitive(s), and re-encrypt the instance portion for return of the document instance to the document storage 106 in a secure fashion.

FIG. 3 illustrates example operations and should not be considered to be limiting with respect to other example operations. In particular, although FIG. 3 is illustrated in a serial or sequential fashion, it may be appreciated that the operations of FIG. 3 may in fact overlap with one another (e.g., be performed partially in parallel), or may occur, in part, in a different order. Additional and alternative implementations also may be apparent, based on other examples as described herein.

Figure 4:
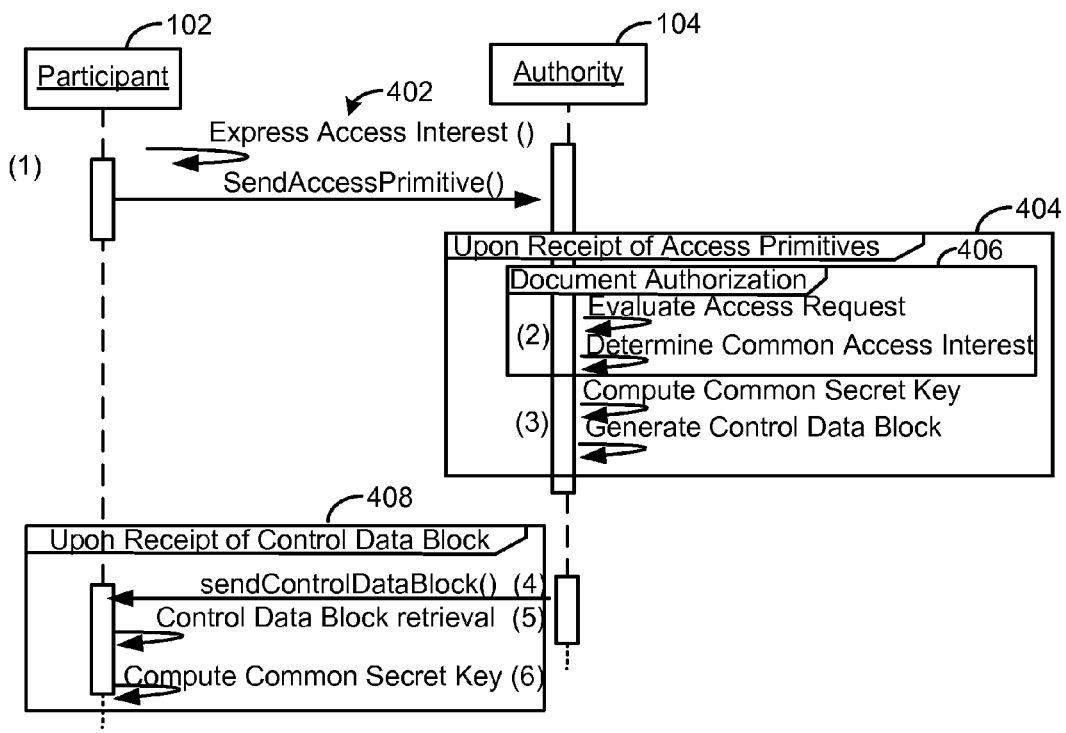
FIG. 4 is a timing diagram illustrating operations of the systems of FIGS. 1 and 2.
Figure 5A:
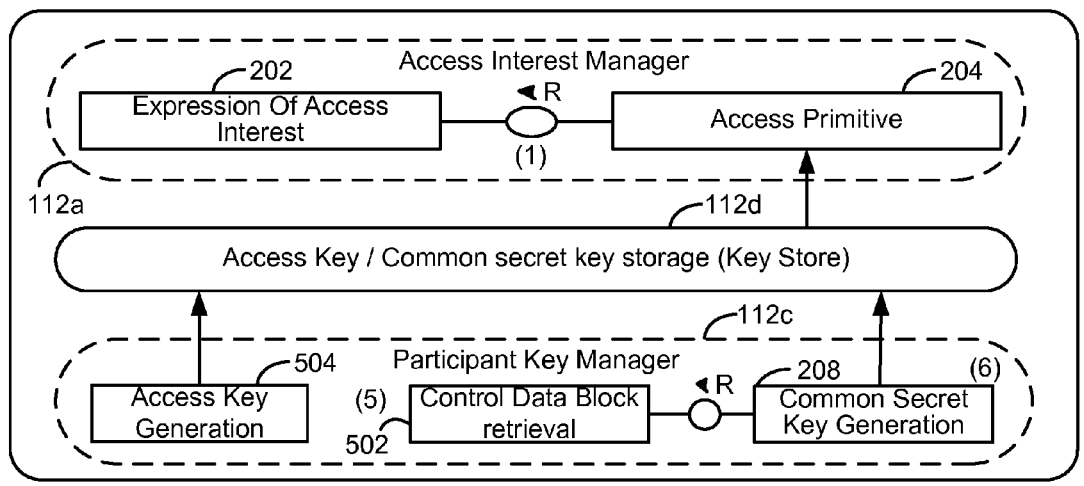
FIGS. 5A and 5B are block diagrams showing more details of the system of FIG. 3, with respect to the timing diagram of FIG. 4.
Figure 5B:
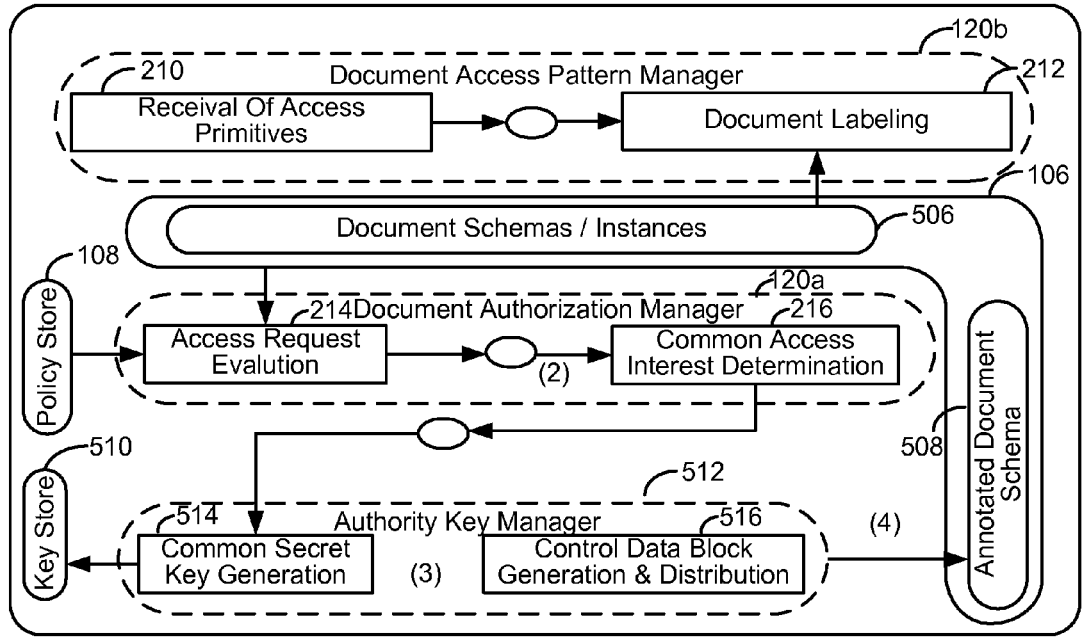

FIG. 4 is a timing diagram illustrating operations of the systems of FIGS. 1 and 2. FIGS. 5A and 5B are block diagrams showing more details of the system of FIG. 2, with respect to the timing diagram of FIG. 4. Specifically, FIG. 4 illustrates more example details regarding the access interest specification phase (302) of FIG. 3, and FIG. 5 illustrates additional detail regarding structure and operation of the system of FIG. 2 during this phase of operation. In FIGS. 4/5A/5B, parenthetical numerals (1)-(6) associate operations of the timing diagram of FIG. 4 with operations of the elements of FIGS. 5A/5B, as shown and described.

In FIGS. 4 and 5A/5B, then, and as referenced above, the participant 102 may, based on a global data model/schema of an XML document, express a desired access interest (e.g., as an access primitive such as view, append, delete, or rename) which is communicated to the authority 104 (402(1)). Operation 402(1) is illustrated in FIG. 5A with reference to the access interest manager 112a, as shown.

The authority 104 may receive the access primitives (404), and, as part of document authorization (406), may then evaluate the access request, together with potential common access interests from other participants (406(2)). This is shown in FIG. 5B with respect to the document authorization manager 120a. The authority 104 may then generate a common secret key and control data block (404(3)), as shown in FIG. 5B with respect to an authority key manager 512 having a module 514 for common secret key generation and a module 516 for generation and distribution of the control data block. As may be understood, such information may thus later be used in the collaboration phase (304) for the described decentralized access control enforcement and verification. The participant 102 receives the control data block (408(4, 5)), as shown in FIG. 5A with respect to a module 502 for control data block retrieval, and computes the common secret key for later distribution and collaboration (408(6)), using the module 208 for common secret key generation of FIG. 5A.

FIG. 5A illustrates some additional features, as well, including a module 504 for access key generation, which, as referenced above, refers to access keys for using/transmitting the access primitives in a secure fashion. Meanwhile the document storage 106 is illustrated as including document schemas/instances 506 themselves, as already described, as well as an annotated document schema 508, which contemplates annotation of document portions with information regarding relevant keys (such as when, e.g., the participant 102 belongs to multiple groups having corresponding multiple common secret keys.

Figure 6:
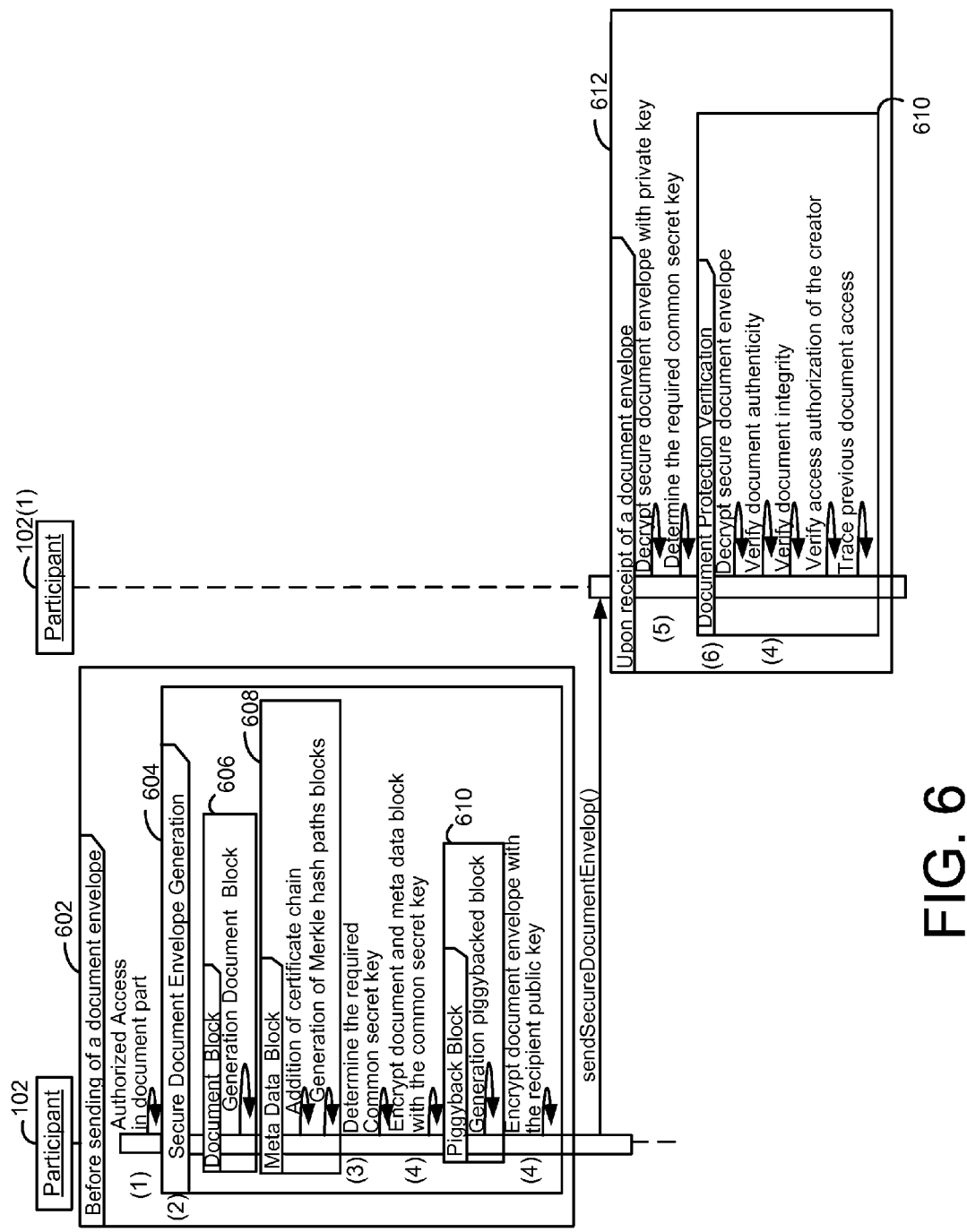
FIG. 6 is a timing diagram illustrating operations of the systems of FIGS. 1 and 2.
Figure 7:
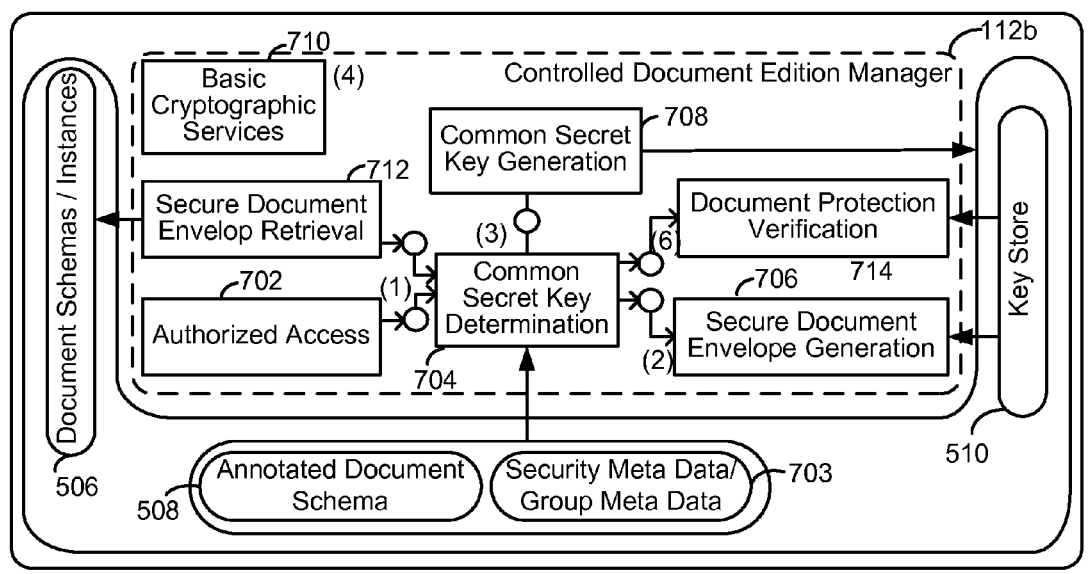
FIG. 7 is a block diagram showing more details of the system of FIG. 2, with respect to the timing diagram of FIG. 6.

FIG. 6 is a timing diagram illustrating operations of the systems of FIGS. 1 and 2. FIG. 7 is a block diagram showing more details of the system of FIG. 2, with respect to the timing diagram of FIG. 6. Specifically, FIG. 6 illustrates more example details regarding the collaboration phase (304) of FIG. 2, and FIG. 7 illustrates additional detail regarding structure and operation of the system of FIG. 2 during this phase of operation. In FIGS. 6/7, parenthetical numerals (1)-(6) associate operations of the timing diagram of FIG. 4 with operations of the elements of FIGS. 5A/5B, as shown and described.

In FIG. 6, collaboration is illustrated as between participants 102 and 102(1) (although it may be appreciated from the above that a participant may also act as an authority (and vice versa) in certain contexts). Before sending a document envelope (602), the initiating participant 102 first determines whether a corresponding access policy had been specified in the interest specification phase (602)(1), as shown by module 702 for authorized access (related/analogous to the module 214 of FIG. 2 for access request evaluation).

The participant 102 then generates the secure document envelope (604), in which the participant 102 generates (using module 706 of FIG. 7) the elements for a document envelope (604)(2) (including generating a document block (606) and generating a meta data block (608), with reference to meta data storage 703). A set of basic cryptographic primitives (604)(3, 4) may then use the context generated during the access interest specification phase to determine the required common secret key and encrypt the document and meta data block therewith, as shown in FIG. 7 with reference to modules 704/708 and 710. A "piggyback block" useful in asynchronous messaging schemes (discussed in more detail, below) may be generated (610) to be sent/associated with the document envelope, whereupon the document envelope may be encrypted with the public key of the recipient participant 102(1), again using basic cryptographic services of the module 710.

Upon receipt thereof (612), then that participant may first decrypt the overall data that has been sent (612)(5) and determine the required common secret key. Then, document protection verification techniques (610)(6) may be executed, with reference to modules 710 and 714 of FIG. 7, and possibly including decryption of the document envelope, verification of document authenticity, integrity, and access authorization of the creator/author, as well as a tracing of previous document accesses (to guard against undesired interception of/tampering with the document by an untrusted entity). Basic available cryptographic primitives may be used for operation (610) with reference to module 710 of FIG. 7

Further with regard to FIGS. 6 and 7, and as referenced above, no special assumptions are made regarding how participants interact. However, in example implementations, it may occur that documents are exchanged on top of an asynchronous messaging scheme (e.g., email). It is in such contexts that the piggyback block referenced above may be used. For example, a document may piggyback all security metadata related to its content and data structure, as well as to the correctness of its updates so far. The piggyback block also may carry the necessary security metadata, making it possible for the receiving participant to decide whether the common access interest group has been updated (e.g., whether a member of the group has joined or departed), and how to proceed if so (e.g., to update the relevant key or to "rekey" as described herein). Thus, with continued reference to FIGS. 6 and 7, the following description provides additional explanation regarding the secure document envelope data referenced therein, including the security metadata, their use for document protection, and their use in navigating through the protected document to access the desired/allowed portions thereof.

Document portions may be arbitrarily exchanged between, and modified by, an authority/editor of any authorized participant. This requires ensuring the authenticity and integrity of the data exchanged, even though the documents may be passed through third-parties like unauthorized participants or a node on the communication network. An authentication mechanism based on a commonly known Merkle Hash Tree technique may be used to produce a Merkle Signature using a static XML document; specifically, a unique digital signature may be applied at the root node of the document to ensure both its authenticity and integrity as a whole.

In addition, for dynamic documents such as described herein, a document containment property may additionally be used. For example, a document containment scheme may be used in which updated (edited) document nodes are considered together with a Merkle signature and Merkle hash path (through the Merkle hash tree), such that the updated document node is authentically contained if a locally-computed Merkle hash value of the updated document node is equal to the verified signature value of the Merkle signature of the root node of the document portion.

As referenced with respect to FIGS. 6 and 7, a secure document envelope may include a document block, meta data block, and piggybacked block. The document block refers to the updated document parts of after the authorized access as performed by the participant(s). Each participant may computes a Merkle signature over the root node of the document block, which it signs together with the received Merkle signatures from the previous editors using its private key. The computed signature yields a value The meta data block consists of a certificate chain and Merkle hash paths blocks, as shown in FIG. 6. Each certificate in the chain, may be formed as described below with respect to certificate chains used by participant joining/departing a common access interest group. Each participant signs its certificate received from its authority (together with the received certificate chain) with its private key, yielding a resulting signature. The Merkle hash path blocks refers to a list of Merkle hash paths of the document nodes of that are required for the recipient to compute the corresponding Merkle signatures locally, as just referenced above. Each participant signs its Merkle hash path together with the received Merkle hash paths starting from the owner authority with its private key, yielding a resulting signature as. Then, the document and meta data blocks are bundled together and encrypted by the common secret key. The encrypted data block with the piggybacked block is encrypted by the public key of other interested participant.

Thus, it may be appreciated from the above that a secure document envelope which is built and initially sent by a participant may be forwarded by any participants in the common access interest group during collaboration. As the document and metadata blocks are only disclosed to a participant having the common secret key, they remain confidential to others who are unable to compute (or re-compute, in the case of a participant joining/departing the group). The signature over every block prevents any malicious participant in the group to include or exclude any fake data block (e.g., fake document parts, certificates and Merkle hash paths). Moreover, upon decrypting the encrypted data block, any participant in the group can verify the received document part's authenticity and integrity as a whole.

In example implementations, an authority may be assumed to send a secure document envelope containing its current document updates (possibly empty) with its Merkle signature to all the participants it manages, so that participants can verify the integrity and authenticity of the document part they are going to collaborate with. For example, as referenced above, when a participant receives the initial secure document envelope containing an update to the document, then the participant may verify the containment in the original document (i.e. authenticity and integrity) by computing a Merkle signature out of the received Merkle hash path and locally computed hash values of the updated document. The computed Merkle signature should match with the verified signature value, as also referenced above. Consequently, any participant upon receipt of a secure document envelope from can verify the document integrity and authenticity by computing the Merkle signatures out of the received Merkle hash paths and locally computed hash values of corresponding document part updates. Each locally computed Merkle signature should match with the corresponding verified signature values of the transmitting participant. Finally, as each participant signs its document updates along with the previous series of updates performed by previous editors the recipient can trace everyone's updates by simply verifying the signatures iteratively. It can also verify the eligibility of previous editor's authorization by iterative verification of the certificate chain.

As described above with respect to FIGS. 1-3, participants may specify a desired portion of a document (schema) for potential access thereto. To assist in parsing and navigating a document, the targeted document may be divided into multiple, disjoint target nodes, and the participants may be assigned to multiple common access interest groups with respect to a disjoint set of document nodes. Consequently, in the collaboration phase, a document node is encrypted by a unique common secret key (which might change when participants join or depart the group). Participants possess the knowledge of the document schema and thus know the structure of each document potion. Thus, each participant may annotate the document part schema nodes with the associated common secret keys that it computes, and then use these as encryption/decryption keys for corresponding document envelopes. As such, participants can determine which key to use to encrypt/decrypt for which document part nodes while they are collaborating (e.g., encrypting before sending and decrypting after the reception of secured document envelopes).

For example, before sending an updated document envelope, participants may parse the schema to find the annotated common secret key associated with the updated document part. Meanwhile, after receiving a document envelope, participants may determine the required decryption key by observing the values from the piggybacked block (if a re-computation of a new common secret key is performed as a result of an indication of a participant joining or leaving the group, the participants may then update their corresponding annotation in the schema with the associated new common secret key.) This annotated document schema is illustrated in FIGS. 5 and 7 as element 508.

Figure 8A:
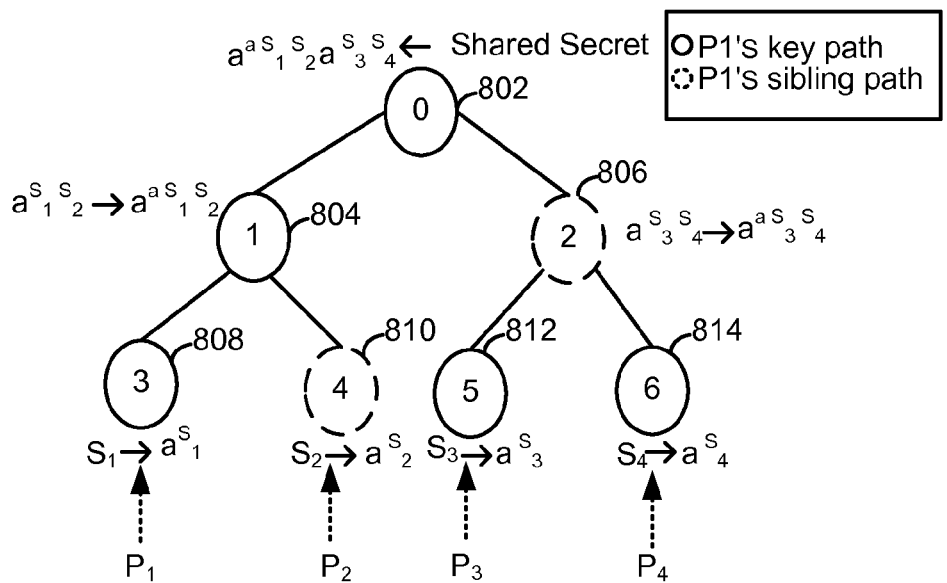
FIGS. 8A and 8B are block diagrams of cryptographic key trees that may be used by the systems of FIGS. 1 and 2.
Figure 8B:
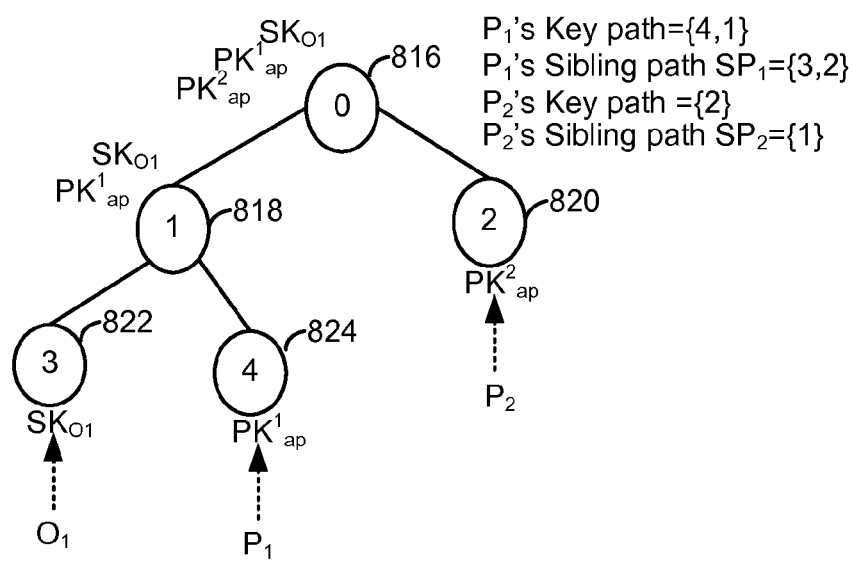

FIGS. 8A and 8B are block diagrams of cryptographic key trees that may be used by the systems of FIGS. 1 and 2. As described above, the system of FIGS. 1 and 2 seek to use common secret key(s) among group(s) of participants having common access interests. As may be appreciated, changes in group membership should be anticipated, and, in any case, participants may or may not know each other's identity (except perhaps for the authority or previous collaborators, although even here, privacy protection may render such knowledge infeasible). These issues are addressed through the adoption of a rekeying mechanism, in which adding a new member would only imply updating the groups sharing the access interests of the new member (and associated keys of the groups).

Keying and rekeying may be done with a group based cryptographic protocol operated on a binary key tree, as in FIGS. 8A and 8B, i.e., a binary search tree in which the list of nodes in the path from the leaf to the root is a key path, and in which a list of sibling nodes of the nodes in a key path is known as a sibling path. Such a key tree enables participants to compute a common secret key based only on a partial knowledge of other members of the group. In addition, the described rekeying mechanism provides backward and forward secrecy.

In example embodiments, the implemented scheme may be based on the binary tree based group Diffie-Hellman (TGDH) cryptographic technique. This scheme may be used to allow a group of participants to compute a common secret without relying on a central authority. In example implementations, rekeying using the TGDH technique may be performed asynchronously, resulting in a "lazy" rekeying that is triggered only when required (e.g., upon receiving a document encrypted for the updated group).

To address the above mentioned issues, the document piggybacks the required group updates caused by participants joining and leaving (voluntarily or involuntarily) in the piggyback block referenced above. These updates may then be communicated when a document is exchanged among participants, thereby suppressing the need for broadcasting and thus rendering the update process asynchronous. The piggybacked information does not need to contain a whole tree update, and therefore requires a relatively limited memory for secret key computation. Then, upon receipt of a document, participants can decide if they need to recompute a secret key (i.e., perform lazy rekeying) to access one particular part of the document.

Thus, FIG. 8A shows a specific example of key tree in which four participants $P_1, P_2, P_3, P_4$, host their Diffie-Hellman (DH) values in leaves 802-814. In the figure, the notation $k \rightarrow a^k$ means that participants compute the DH private value and then compute the DH public value $a^k$ and broadcast it. The legend shows $P_1$'s key path includes nodes 808, 804 to the shared secret value at node "0" 802, and $P_1$'s sibling path includes nodes 810, 806, as shown.

FIG. 8B shows a similar key tree for participants $P_1$ and $P_2$, and for Owner (authority) $O_1$, and associated secret keys (notated as SK and PK, with the notation "ap" referring to an access primitive, since, as explained above, each participant possesses a set of access key pairs for each access primitive). In FIG. 8B, nodes 816-824 and the illustrated legend show that $P_1$'s key path includes nodes 824, 818, while $P_1$'s sibling path includes nodes 822, 820, and $P_2$'s key path includes node 820, and $P_2$'s sibling path includes nodes 818. FIG. 8B is thus useful in understanding example implementations for key use and management, e.g., generation and distribution of the control data block 122 of FIG. 1 and general management techniques for the common secret key, and also techniques for delegating access control and for dynamically updating group memberships upon joining/departure of a member (using lazy rekeying).

For example, with respect to the control data block 122, and as referenced above, participants may be assumed not to know others with the same access interest (i.e., within their group), yet must be able to compute a common secret key. After determining the common access interest groups, the authority (e.g., owner) 104 is responsible for building a control data block containing information for common secret key computation for each member of a group it manages. This block may include a set of individual blocks to be associated with the members of the group in question, and defined in terms of the sibling path (i.e., DH values which a participant needs to compute its key path) and public key of each participant. This allows sharing of the required information, without allowing one participant to identify other members in the group.

The authority 104 may then encrypt each individual block of the control data block with the public key of every participant (as determined from the submitted credential and signed requested access pattern) and sends this information as well. Knowledge of the control data block enables each participant to compute the common secret key of its respective groups and act as a delegate afterwards. Such a message cannot be intercepted to gain access to protected documents since each individual block is encrypted with the authorized member's public key.

The key tree of FIG. 8B also may be helpful in understanding additional management details regarding the common secret key of a common access interest group. In particular, in a distributed environment like the EAW scenario referenced above and described in detail with respect to FIGS. 10A-12, the presence of a centralized entity for computing and distributing the common secret key. Rather, in the described implementations, the owner (original authority) takes charge of initializing the group collaboration by exploiting the key tree structure of TGDH as shown in FIGS. 8A and 8B.

In particular, the owner may generate a key tree by providing its DH private value in one leaf node and taking other participants' DH public values (i.e. Public access keys one by one as other leaf nodes, as shown in FIG. 8B. In the process of such bottom-up computation of the DH private values in its key-path, a common secret is computed for the root node. That is, every node in the key tree is assigned a unique number, starting with the root node that is assigned 0. Each node is associated with a key pair including a DH private value and a DH public value. For every node, the DH private value may be computed recursively, depending on whether the node is a leaf node or non-leaf node. Computing the DH private value of a non-leaf node requires the knowledge of the DH private value of one of the two child nodes and the DH public value of the other child node. In effect, one participant only needs to compute the DH private values along its key-path. In other words, one participant only needs to know the DH public values of the siblings of the nodes of its key-path (sibling path). Therefore, the private value computed for the root node represents the secret for all the participants (including owner). At this point, the common secret key may be derived from the shared secret (shown at the top of FIG. 8A).

For example, taking two participants' public keys (e.g., one of the PK values of FIG. 8B), the owner O1 builds the key tree in FIG. 8B. Once the key-tree is generated, the owner can determine the sibling path values] required for each participant in the group, which it sends to them as part of the control data block 122, as already described. The owner, acting as the initializer of a group collaboration, does not make the framework a centralized one as all the participants need to compute the common secret key along their key-paths by themselves. Moreover, the computation of the shared secret is contributory in nature as the owner takes public access keys of all participants as the leaf nodes of the logical key tree to compute the common secret key and thereby to compute the sibling path. Furthermore, this scheme has at least the following advantages. First, participants can compute the common secret key without either generating the complete key tree or identifying other participants in the group. Second, group membership scales easily.

The issue of the dynamic nature of the common access interest groups and the tendency of members to join or depart at a given time is described above. It may thus be appreciated that managing such dynamically joining and leaving participants requires updating the common secret key. The term "lazy rekeying" is referenced and described above, and refers to the act of re-computation of a new common secret key by a participant, but only when it is actually required to do so (as opposed to, for example, re-computing the common secret key at all members as soon as one member does so). Such a re-computation may take place when interacting with a participant that knows about a different version of the group; e.g., which may happen upon receiving a document envelope.

In this regard, and in the further description, the term "neighbor" refers, for a given participant, to a list of participants who provide their DH public values in order to compute the DH private values along the key path of the first participant. Also, a "Top End Key-path Value" (TEK) and Top End Sibling-path Value (TES) refer respectively to the participant's computed DH private value associated with the top most node along its key path, and to the received DH public value associated with the top most node along its sibling path.

Accordingly, with reference to FIG. 8A, P1 and P2 are neighbors to each other and so are P3 and P4. The DH values of nodes 1 (804) and 2 (806) are the TEK and TES for P1, P2 respectively, and the DH values of nodes 2 (806) and 1 (804) are the TEK and TES of P3, P4 respectively. In other words, neighbors have exactly the same TEK and TES for a common access interest group. It may be observed from a participant's point of view that any dynamic change in its neighbors incurs an update in its key-path and similarly any dynamic change in its non-neighbors incurs an update in its sibling path. In particular, incurred dynamic changes cause new DH values to be computed in corresponding key paths and sibling paths that are accumulated in TEK and TES respectively.

Lazy rekeying relies on the usage of a neighbor list and the pair TES/TEK maintained by each participant in a group, where TES/TEK values are piggybacked with the secure document envelope in the manner described above with respect to FIGS. 6/7. Then, a neighbor list refers to a history of neighboring participants with which P1 is collaborating, and P1 updates its neighbor list and TEK only when acting as a delegate for a joining/leaving event or when receiving a secure document envelope containing a new TEK value indicating there has been a change in its neighbor list.

P1 updates its TES only when it receives a document envelope containing a new TES value, meaning there is a dynamic change in the key-paths associated with its TES. The TES/TEK being piggybacked merely adds a simple value(s) in the envelope, which allows for easy scaling of the system. As group membership changes, initial re-computation may be performed only for the key-paths associated with the current authority and the participant that is subject to join or leave. As such, the authority and the subject participant can immediately compute the new common secret key along their key-paths. The pair TES/TEK also contains the subject participant's key, so that a recipient can update its neighbor list accordingly. Then, both can either exchange previous document updates to the existing group members or perform new updates in documents and then exchange new document updates to the current group members including/excluding the subject participant. For the former, the secure document envelope may be piggybacked with the previous TES/TEK values, whereas for the latter the new TES/TEK may be piggybacked.

It may be appreciated that in such lazy re-keying, participants who are initially unaffected by the change in membership and change in common secret key may continue to collaborate with their previous knowledge of common secret keys and without stopping their collaboration, since they do not even notice the changes associated with the join/leave event. However, such participants will eventually detect the change when they receive a secure document envelope containing new piggybacked information, at which point they may re-compute the new common secret key utilizing the received TES/TEK. Thus, the dynamic changes in the group need be neither broadcasted nor requested; rather, available participants may continue their collaboration with previous common secret key in the meantime until a change becomes necessary.

With the above-described techniques, it is not necessary for the authority 104 to manage group membership; instead, such management may be delegated to the participants in the common access interest group. For example, the control data block 122 may be used to provide descriptions of access decision delegations, as well as a description of the access control policy rules that apply to the document portion whose access is granted to group members.

Specifically, a chain of certificates may be used that originate from the authority 104 (owner) and going to the participant and with respect to a particular access primitive. Each certificate assert that the authority 104 authorizes the participant to perform the specified access primitive with respect to the document nodes of a specified/requested document. Thus, the first certificate in the chain may be from the owner and may enable a participant to be a delegate, which then also may add its certificate in the chain, thereby delegating further. This certificate then can be used as a proof to other participants of the common access interest group that the participant in question was entitled to access the document portion in question, and also provides for tracing of the fact that the participant has in fact performed the alleged/allowed updates.

Such delegations may include transmitting of security objectives, e.g., access control policy rules, such as that particular data of a document in question should be reserved for modification by a particular role, person, or class of persons. Then, based on the chain of certificates and the security objectives, the participant, acting as a delegate for the owner, may take over the access decision related tasks of the owner in the interest specification phase, and can evaluate the requested access.

If a new participant sends its access primitives to a participant acting as a delegated authority, then the receiving participant authority may evaluate the new participant's request and determine its eligibility with respect to becoming a new member of an existing group (or to create a new group), including, if necessary re-computing its key path (taking the new member's access key into account), and sends the control data block 122 to the new members. The access control policy might additionally specify whether backward secrecy applies to the new participant, which may be described in the security object. If so, the new member can only start document exchanges using the new common secret key from that point on. Otherwise, the authority sends the previous common secret key(s) to the new participant, so that the new participant may observe the previous updates and collaborate on these if possible.

Other members may not collaborate on document updates performed with the new key right way after new members join, and thus do not re-compute the new common secret key, at least not immediately. Rather, available members may re-compute the corresponding common secret key using lazy rekeying as described above. In case of a voluntary leave, the participant sends its associated certificate in similar fashion to the direct authority that the participant joined before. Then, the delegate participant may delete the leaving member node from its key path and re-compute a new key-path. In other scenarios, the participant's authority may decide whether his group members' leave. If so, and if forward secrecy applies, P1 immediately sends a secure document envelope piggybacked with new TES/TEK values to the available members of the groups wherein the leaving participant was a member of so that they can re compute the new common secret key. Then, available members re-compute the new common secret key and collaborate further using it. Otherwise, the other members re-compute only when receiving a secure document envelope from other participants in the group. If the direct authority is unavailable at a given time, then the subject participant may inform to the next indirect authority accordingly that it knows from the certificate chain of the received control data block.

Based on the above description of FIGS. 4-8, the operations of FIG. 3 may be re-visited in more detail and using the relevant concepts and terminology of FIGS. 4-8. In particular, as described, a document collaboration may be initiated by the receipt of a first wave of access interests of the participants to the owners (original authorities) in the access interest specification phase. The collaboration phase, during which the document is actually edited and exchanged, involves document viewing, update, and verification.

In the access interest specification phase, the following operations are executed with respect to the authority 104 (referenced as $A_i$ in the below). First, access interests are received from "n" other participants. Then, evaluation of the access control policy 108 may occur (directly by the owner, or, in the case of a delegated authority, with reference to the security objective received from the owner). Common access interest groups may be determined as described above and also in more detail below with respect to FIG. 10. Then, the control data block 122 may be generated and distributed. Thus, in this initial phase, the authority decides on a fixed list of members of a common access interest groups, for which access control is enforced later on by participants themselves using encryption. This scheme allows any participant having computed the common secret key at this stage to access and update document parts at any time after the interest specification phase.

Upon receipt of the control data block, an authorized participant performs the following steps. First, the participant retrieves the control data block 122 by decrypting the secure document envelope using its secret key, and retrieves the required sibling path values, as well as the certificate chain associated with the access primitive being requested and the security object, which together allow the participant to maintain eligibility to perform the corresponding access and to be a delegate afterwards. Then, the common secret key is computed using the received sibling path values as described above.

In the subsequent collaboration phase, upon receipt of a secure document envelope from a transmitting participant in the same group, the receiving participant first retrieves the piggybacked block and decrypts the secure document envelope with its secret key and retrieves the TES/TEK value. The integrity of TES/TEK may be verified using the public key of the transmitting participant, whereupon if the receiving participant possesses the same TES/TEK value then it determines the required common secret key as described above. Otherwise, the receiving participant determines that a new common secret key is needed (e.g., due to a join/depart event of a group member), and proceeds with the lazy rekeying protocol described above.

The participant may then decrypt the encrypted block of components with the common secret key, and then verify the integrity of the certificate chain and Merkle hash paths as described above. Document authenticity, integrity and containment check(s) may then be performed, as also described above.

Finally, the participant may prepare to send the updated document portion by building the secure document envelope incrementally. Specifically, the document block may be built using a Merkle signature over the root node of the updated document and signed using the participant's secret key together with the received series of updates and with the addition of the signature and updated document parts. Then, the metadata block may be built by computing a signature over its certificate together with the chain of certificates using the participant's secret key and adding the signature and the certificate chain. A signature of the participant's Merkle hash path together with the previous editors' Merkle hash paths may be computed, and then the participant may sign and add the signature and the Merkle hash paths.

The required common secret key to encrypt the document and meta data blocks as described above may be determined, and those block may be encrypted with the common secret key. The piggybacked block may be constructed using the signature of TES/TEK using the participant's secret key, with the addition of the signature and the TES/TEK value. Finally, the secure document envelope may be provided by encrypting the whole block using recipient's public key.

Figure 9A:
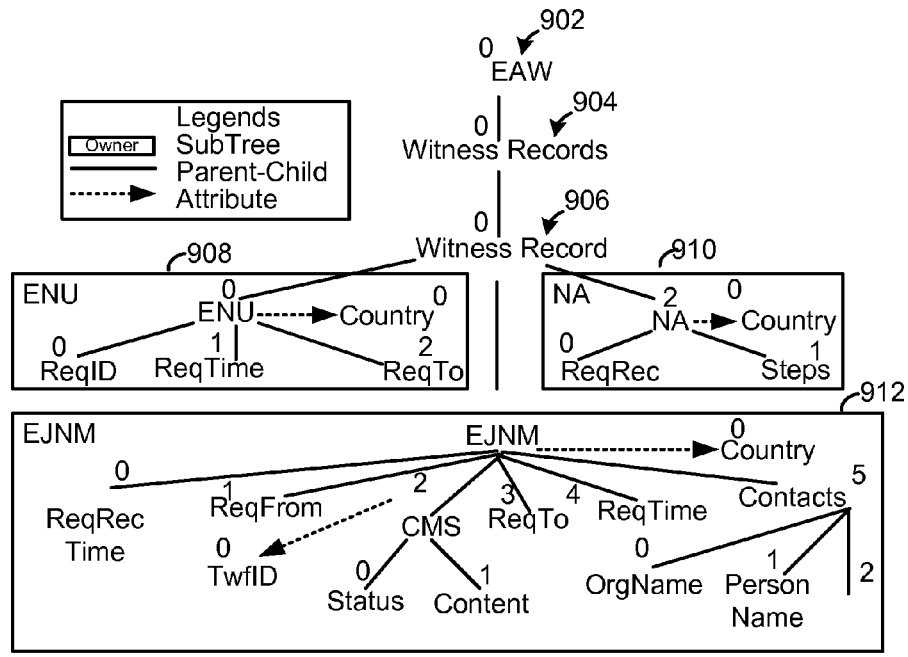
FIGS. 9A and 9B are block diagrams of an example document schema and document instance, respectively.
Figure 9B:
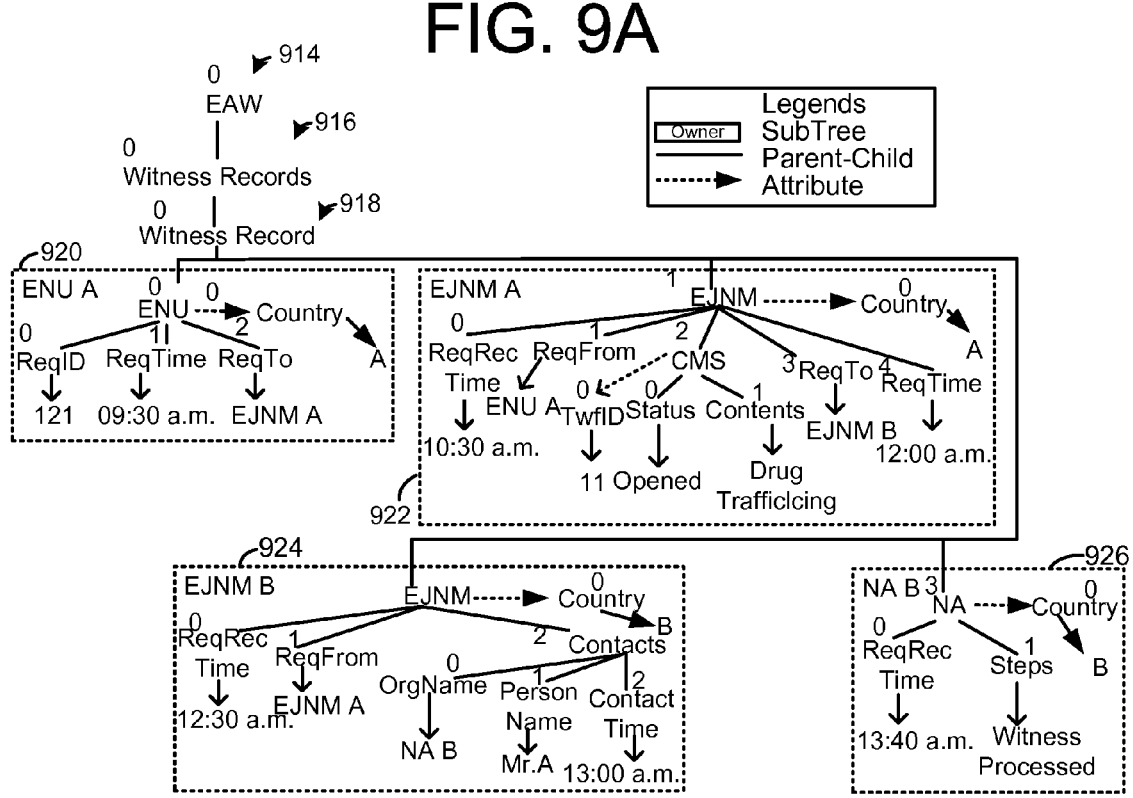

FIGS. 9A and 9B are block diagrams of a document schema and document instance, respectively, for a European Arrest Warrant (EAW) application scenario, which, as may be appreciated, serves merely as a non-limiting example of virtually any sort of heavily decentralized document collaboration, which also may include manufacturing, design data, product lifecycle management, tax & revenue, social security, or health care files, to name just a few other examples. FIGS. 9A and 9B provide details regarding the example referenced above, in which a collaboration takes place between two European Union (EU) administrative bodies, Europol and Eurojust, and the associated 27 member states authorities. Europol and Eurojust have a representative; respectively, a Europol National Member and a Eurojust National Member, for each of the 27 member states of the Union. Each member state has its national contact points (National Authority) for Europol and Eurojust. Europol, Eurojust, the associated law enforcement authorities and their employees (participants) collaborate whenever there is an occurrence of cross border organized crime in the EU, which entails a request for Mutual Legal Assistance (MLA).

In such cases, participants may collaboratively define and work on a document called European Arrest Warrant (EAW). The EAW of FIG. 9A thus illustrates a document shema for an EAW 902, which includes witness records 904, which include a specific witness record 906. The witness record 906 includes ENU 908, NA 910, and EJNM 912, as shown. Then, FIG. 9B illustrates a document instance of the document schema of FIG. 9A. In FIG. 9B the instance EAW 914 includes the instance witness records 916, which include the instance witness record 918. The witness record 918 includes ENU A 920 and EJNM A 922, as well as EJNM B 924 and NA B 926.

In the example, a Europol National Unit of country A (ENU A 920) makes a written request of assistance (for a witness protection) to a Eurojust National Member of country A (EJNMA 922). The EJNMA 922 opens a Temporary Work File (Twf) in a local Case Management System (CMS), as shown. The EJNMA 922 contacts Eurojust National Member of
country B (EJNMB 924) by forwarding the request of assistance. The EJNMB 924 contacts the responsible national authority of country B (NAB 926). Steps may be taken by the responsible NAB 926 to provide the requested assistance.

Collaborative activities on the EAW document illustrate an example scenario in which the example embodiments may be implemented. For example, different parts of the EAW document may be structured according to the local regulations and policies of the authorities of the European Union. For example, one country may need to know the religious belief of a suspect, whereas disclosure of one's religious belief may be prohibited by law in another country. Such situations may require instantiating different document instances and having different access policies. An ENUA employee may send an update to an EJNMA employee. NAB 926 may need to access a deeply nested element "PersonName" containing a suspect's name that is owned by the manager of EJNMB 924. Furthermore, the manager may not be available when, e.g., the NAB 926 requires information from other participants. As a final example, the manager may also decide to delegate the access decision regarding PersonName to one of its subordinates during his vacation time.

Figure 10:
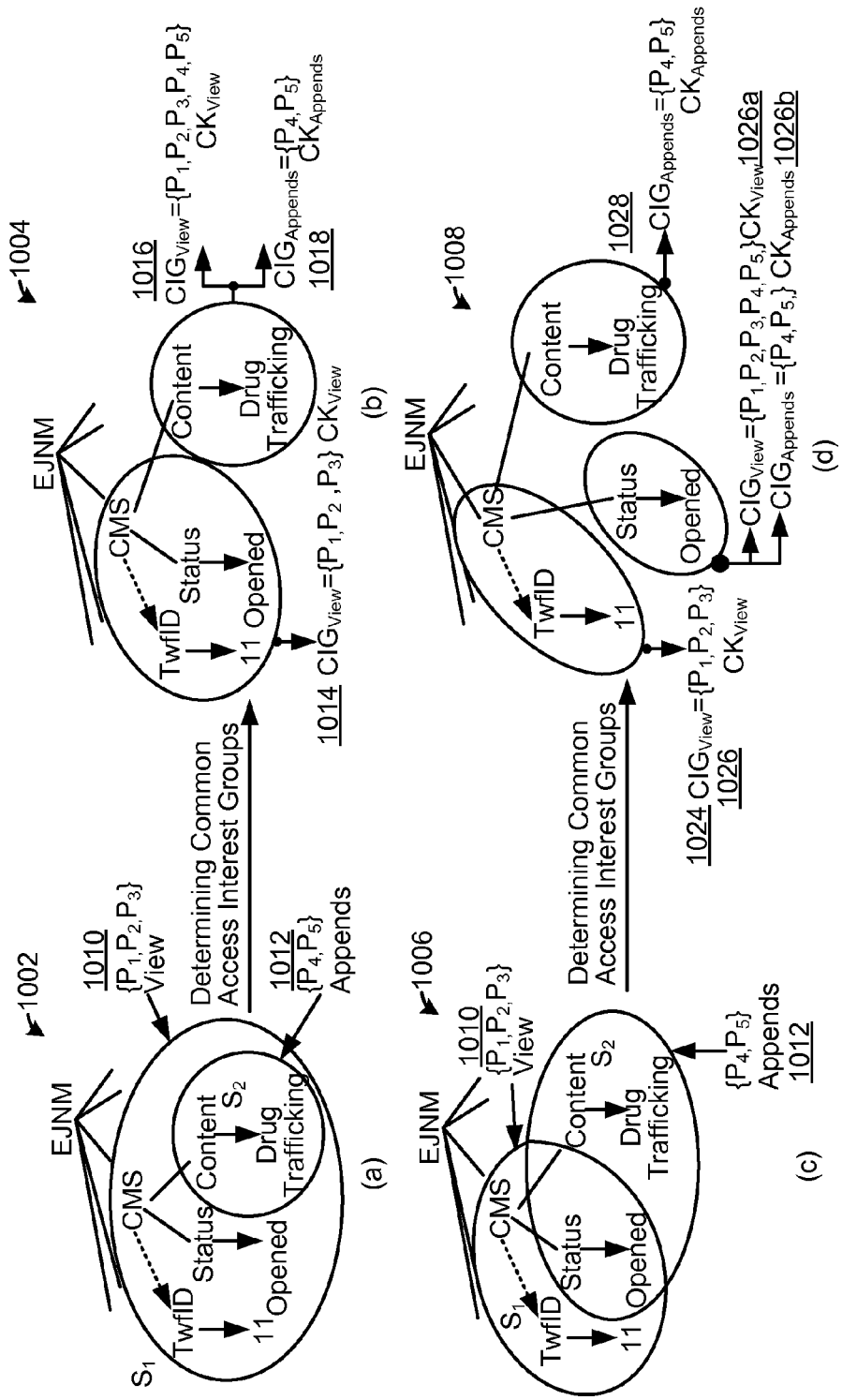
FIG. 10 is a block diagram illustrating formation of common access interest groups.

FIG. 10 is a block diagram illustrating formation of common access interest groups, using the example of FIGS. 9A and 9B. As already described, the access interest specification phase includes an expression of access interest (EAI) with respect to a document portion, which might be referred to as a target portion, such that an EAI is considered a valid EAI if the target portion exists in the document and may allowably be accessed by the specified access primitive of the EAI. Then, the (public) access keys may be defined with respect to any such valid EAI, and these access keys may be passed to the authority 104 as parameters of the access primitives, and may be signed with the private key of the participant for certification purposes.

An access primitive may thus be considered to take valid EAIs ('targetEAI' and/or 'sourceEAI'), a propagation value, and the interested participant's access key as inputs, and outputs a subset of a document part. The 'targetEAI', 'sourceEAI" and propagation are evaluated on the owner's document portion. The propagation input takes a non-negative integer value, n or +. If it is n greater than or equal to 0 or + then the access interest is also propagated toward the n-th descendant nodes (elements and its attributes) or the whole subtree respectively. Propagation 0 means that the access interest is not propagated toward the descendants.

For example, the access primitive "view" may input (access key, target EAI, and propagation value), and return the nodes of the document portion that match the valid 'targetEAI'. For a propagation value of 0, only the matching node with the 'targetEAI' without the descendant nodes is returned. The access primitive "append" may input (access key, target EAI, new node, and propagation value), and create a new node (e.g., element, attribute) with the name 'newNode' as a child node of each matching node of the valid 'targetEAI." If the propagation value is 0, only the first matching node is considered.

The access primitive "delete" may input (access key, target EAI, and propagation value), and delete the nodes rooted at the matching valid 'targetEAI.' The deletion is performed either up to the n-th descendants of the matching node or the whole subtree from that node. As a final example, the "rename" access primitive may input (access key, target EAI, new Name, and propagation value), and may rename the nodes of the document portions matching the valid 'targetEAI'. It is propagated either down to the n-th descendant nodes of the matching node or down the whole subtree rooted at the matching 'targetEAI'. Each propagation of the access primitive renames the corresponding descendant node with a new name from the list 'newName[ ]'.

The Append, Delete, and Rename primitives may be called update primitives, because they implicitly imply the View primitive to the nodes they apply to. Based on these primitives, there might be other composite operations, such as Copy(key, sourceEAI, targetEAI, [Propagation value]) and Move(key, sourceEAI, targetEAI, [Propagation value]). Copy creates an exact subtree up to n-th descendants of the document parts rooted at the node matching the valid 'sourceEAI'. The created subtree is then appended as a child of the nodes matching the valid 'targetEAI'. It uses the Append primitive. Move does exactly the same operation as Copy, and in addition it deletes the subtree matched by the 'sourceEAI'.

Using the above definitions, a common access interest group or CIG may be expressed in terms of access primitives "ap" which include view, append, delete, and rename, with reference to a document portion $d_i$. Then the CIG for a particular document portion and access primitive may be defined as a set of public access keys that define a set of participants have the same access interest (e.g., access primitives with the same "target EAI" and propagation value) and that satisfy the access control policy of the authority for the document portion.

Such common access interest groups may be determined by evaluating all of the access interests during the access interest specification phase, after which the authority may determine a disjoint set of common access interest groups, CIGs with respect to the 'targetEAI's of all the access primitives. It may be assumed for the example(s) that the authority is a member of every group it is managing. The determination of the disjoint set of CIGs is described as follows. First, assume that two access primitives ap1 and ap2 from P1 and P2 containing targetEAIs e1, e2 respectively refer to the two subtrees S1 and S2 of the document part di and Oi is the authority of di. If S1 and S2 are disjoint, meaning the union of S1 and S2 is null, then e1 and e2 do not overlap. P1 and P2 are assigned to two disjoint sets of common access interest groups CIGap1={P1} and CIGap2={P2}, respectively.

If any subtree S2 is either (1) entirely subsumed by the other S1, or (2) partly subsumed by the other S1, then some overlapping occurs between e1 and e2. Determining the disjoint set of common access interest groups in this case proceeds as follows. Regarding case (1), two disjoint subtrees of nodes may be determined: one with the subsumed subtree S2 and the other with S1\S2. Regarding case (2), three disjoint subtrees of nodes are determined: one with S1\S2, the second with S1 ∩ S2 and the last with S2\S1. Each disjoint subtree is associated with an access primitive accordingly.

Update primitives generate two different groups CIGUi and CIGVi while View primitives require only one group CIGVi to be formed. Note that any participant having an Update access interest may need to be a member of multiple groups because of the implicit granting of a view access and of the overlapping of different access interests. For example, again regarding case (1), assuming that e1 and e2 respectively refer to view and update primitives, the disjoint groups formed are: CIGV1\2={P1}, CIGV2={P2} and CIGU2={P2}. If on the contrary e1 and e2 respectively refer to update and view primitives, the disjoint groups formed are now: CIGV1\2={P1}, CIGU1\2={P1}, CIGV2={P1, P2} and CIGU2={P1}. In case (2), assuming that e1 and e2 respectively refer to view and update primitives, the disjoint groups formed are: CIGV1\2={P1}, CIGV1\2={P1, P2}, CIGU1\2={P2}, CIGV2\1={P2} and CIGU2\1={P2}. In contrast, if e1 and e2 respectively refer to update and view primitives, the disjoint groups formed are: CIGV1\2={P1}, CIGU1\2={P1}, CIGV1\2={P1, P2}, CIGU1\2={P1} and CIGV2\1={P2}.

FIG. 10 depicts case (1) and (2) just referenced, considering view and append primitives for S1 and S2 respectively from P1, P2, P3 and P4, P5. Specifically, in FIG. 10, in example 1002, S2 (for append primitive for $P_4$ and $P_5$ is subsumed by S1 for view primitive 1010 for participants $P_1$, $P_2$ and $P_3$. Then, in example 1004, three common access interest groups 1014, 1016, 1018 are determined with two disjoint sets of nodes. In portion 1006, S2 is partly subsumed by S1, so that in portion 1008, four common access interest groups 1024, 1026a, 1026b, and 1028 are determined with three disjoint sets of nodes.

Figure 11:
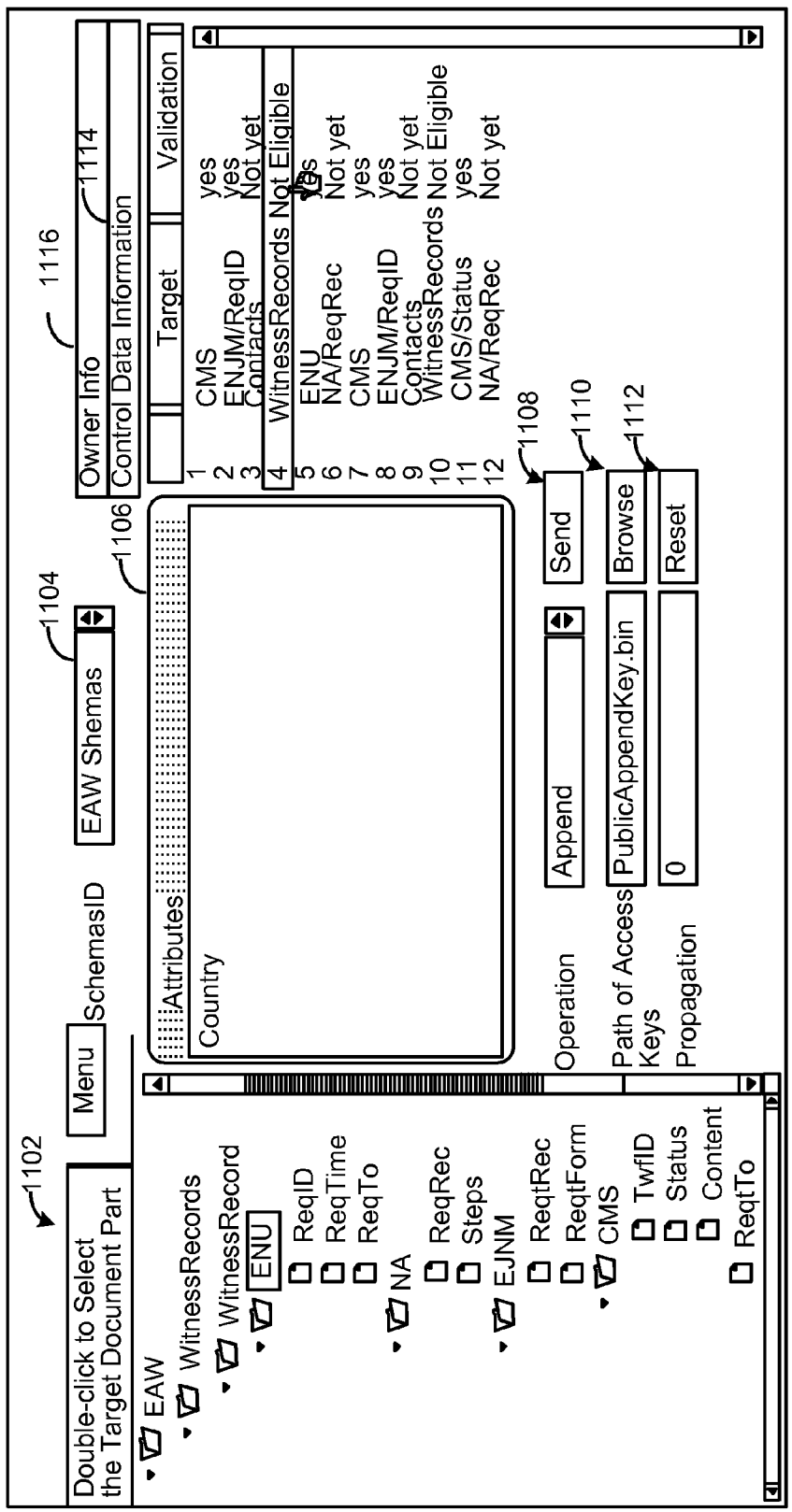
FIG. 11 is a screenshot illustrating aspects of the access interest specification phase of the systems of FIGS. 1 and 2, based on the example of FIGS. 9A and 9B.

FIG. 11 is a screenshot illustrating aspects of the access interest specification phase of the systems of FIGS. 1 and 2, based on the example of FIGS. 9A and 9B. In FIG. 11, a screen portion 1102 illustrates the document tree of the schema of FIG. 9A, as selected from menu 1104. Thus, these portions correspond to portions 116a and 116d of FIG. 1.

As shown in the example, the document portion ENU is illustrated that is shown in a portion 1106 as being associated with the attribute "country." The desired access primitive "append" is illustrated as being selected from a menu in portion 1108 (thus corresponding to button 116f of FIG. 1). Portion 1110 illustrates selection of a path for access keys, and portion 1112 illustrates selection of a propagation value, where the use of these selection features may be appreciated from the above descriptions of FIGS. 6-8.

Owner information may be selected and shown in a portion 1116 (e.g., for the selected ENU, owner information may specify the European National Unit and provide a description of, e.g., the characteristics and duties of the ENU). Control data information is shown as being selected in a portion 1114, in which target EAIs are illustrated along with associated validation information therefor.

Figure 12:
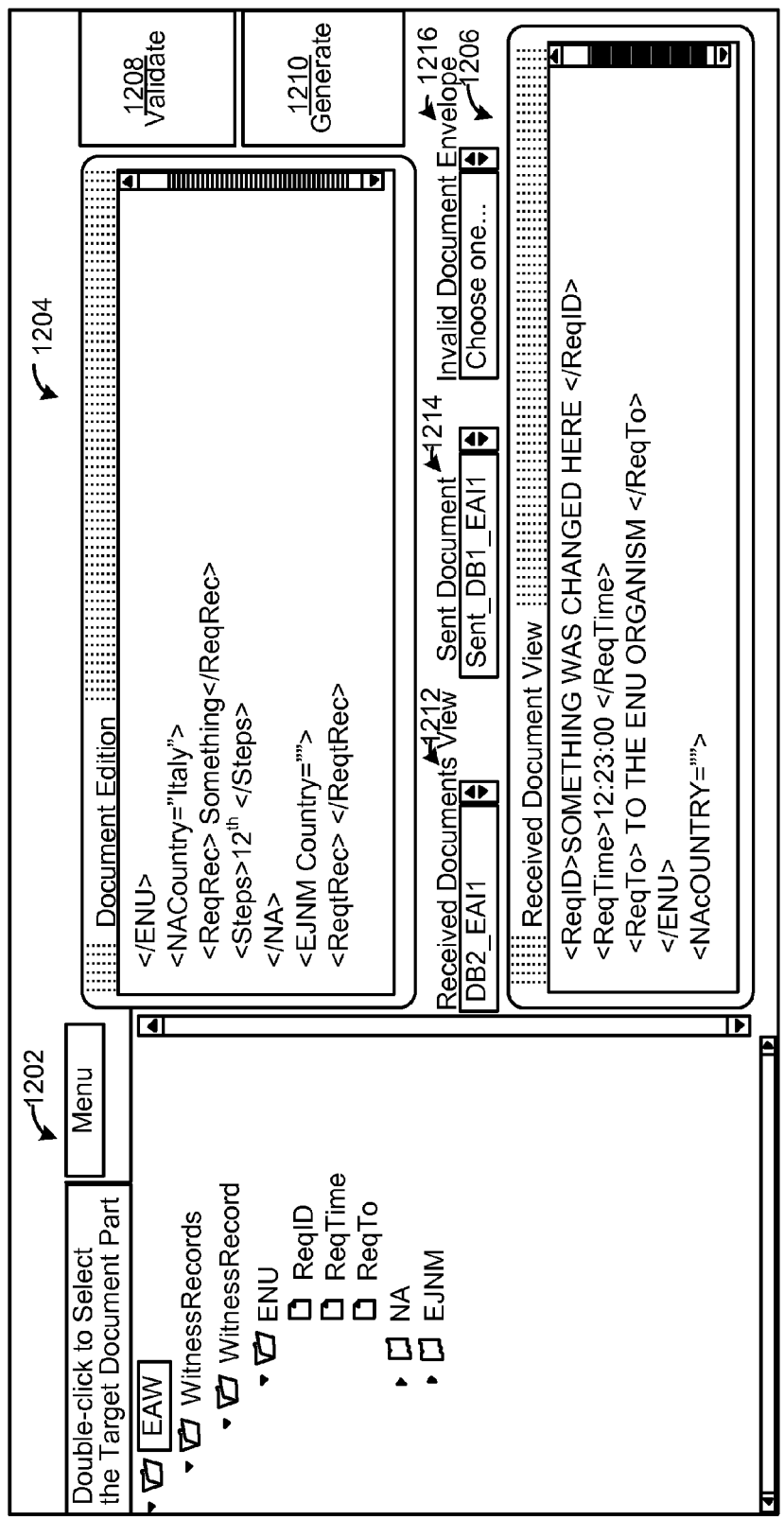
FIG. 12 is a screenshot illustrating aspects of the collaboration phase of the systems of FIGS. 1 and 2, based on the example of FIGS. 9A and 9B.

FIG. 12 is a screenshot illustrating aspects of the collaboration phase of the systems of FIGS. 1 and 2, based on the example of FIGS. 9A and 9B. In FIG. 12, a portion 1202 illustrates the available target document portions, while a portion 1204 illustrates a current document edition (e.g., corresponding to portion 116h of FIG. 1). A portion 1206 illustrates a received document view for the document as received, e.g., from a previous participant(s), as may be selected using menu 1212. The document edition may be validated using button 1208 and generated (e.g., re-encrypted) for transmission using a button 1210, where a menu 1214 allows for selection of documents as sent (e.g., to other collaborating participant(s)). Finally, a menu 1216 allows for selection/determination of a situation in which an invalid document envelope is found, e.g., when a validation error and/or containment error occurs.

The described techniques provide for numerous advantages. For example, the described techniques provide for fully decentralised fine-grained document access control, since access on any instance of a document schema, at any level of granularity can be enforced without the presence of a trusted third party. As another example advantage, participants may identify and work on basis of a set of common access patterns on (nested) elements, thereby reducing any overhead in the initial access interest specification phase. Further, document owners may have full control on identifying any changes to document instances by their collaboration partners, thus allowing preservation of integrity, and supporting change control and versioning. Document owners may delegate control over document parts to a collaboration partner, reducing potential bottlenecks and supporting asynchronous communication scenarios. As a final example, the proposed framework supports decentralized fine-grained access control on any XML document, ranging from engineering documents in a supply chain; legal contracts; health care records or even programming code in a decentralised development project.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A computer system comprising:
at least one processor;
non-transitory computer-readable storage medium including instructions executable by the at least one processor, the instructions configured to implement,
a document access pattern manager configured to receive access requests from a plurality of collaboration participants for access to a document instance, the access requests specified using a document schema of the document instance and referencing at least one of a first schema portion for access to a first document instance portion and a second schema portion for access to a second document instance portion;
a document authorization manager configured to determine a first common access interest group of the collaboration participants related to the first document instance portion and a second common access interest group of the collaboration participants related to the second document instance portion, based on the access requests and on an access control policy specified in terms of access credentials; and
a key manager configured to provide a first control data block to the participants of the first common access interest group, the first control data block including information for generating a first common secret key that is common to the participants of the first common access interest group, the key manager configured to provide a second control data block to the participants of the second common access interest group, the second control data block including information for generating a second common secret key that is common to the participants of the second common access interest group, wherein at least one of the first and second control data blocks includes authority delegation information for authorizing a collaboration participant within a respective common access interest group to operate as a new authority to manage access control of a respective document instance portion, the authority delegation information including a chain of certificates including a certificate from an owner of at least a portion of the document instance that authorizes the collaboration participate to operate as the new authority.

2. The computer system of claim 1 wherein each of the access requests are specified in terms of an access primitive describing a type of access requested for the first or second document instance portion, and the access primitive includes operations to view, append, delete, or rename the first or second document portion.

3. The computer system of claim 1 wherein the document authorization manager and the document access pattern manager are implemented at an authority associated with membership management of the first or second common access interest group, and wherein the membership management is delegated to a collaboration participant of the first or second common access interest group when the authority is unavailable.

4. The computer system of claim 1 further comprising:
a document envelope generator configured to generate a document envelope containing content updates to the first or second document instance portion as implemented by collaboration participants of the first or second common access interest group.

5. The computer system of claim 4 wherein the document envelope is encrypted/decrypted using the first or second common secret key.

6. The computer system of claim 1 wherein the document instance includes an extensible mark-up language (XML) document.

7. A computer program product for executing process models, the computer program product being tangibly embodied on a non-transitory computer-readable medium and including executable code that, when executed, is configured to cause at least one data processing apparatus to:

receive access requests from collaboration participants for access to a document instance, the access requests specified using a document schema of the document instance and referencing at least one of a first schema portion for access to a first document instance portion and a second schema portion for access to a second document instance portion;

determine a first common access interest group of the collaboration participants related to the first document instance portion and a second common access interest group of the collaboration participants related to the second document instance portion, based on the access requests, access credentials of the collaboration participants, and on an access control policy specified in terms of the access credentials;

provide a first control data block to the participants of the first common access interest group, the first control data block including information for generating a first common secret key that is common to the participants of the first common access interest group, provide a second control data block to the participants of the second common access interest group, the second control data block including information for generating a second common secret key that is common to the participants of the second common access interest group, wherein at least one of the first and second control data blocks includes authority delegation information for authorizing a collaboration participant within a respective common access interest group to operate as a new authority to manage access control of a respective document instance portion, the authority delegation information including a chain of certificates including a certificate from an owner of at least a portion of the document instance that authorizes the collaboration participate to operate as the new authority;

encrypt the first and second document instance portions using the access control policy;

provide first access to the document instance for access to the first document instance portion by an accessing participant of the first common access interest group, the first access including decryption of the first document instance portion using the first common secret key; and provide second access to the document instance for access to the second document instance portion by an accessing participant of the second common access interest group, the second access including decryption of the second document instance portion using the second common secret key.

8. The computer program product of claim 7 wherein each of the access requests are specified in terms of an access primitive describing a type of access requested for the first document instance portion or the second document instance portion.

9. The computer program product of claim 7 wherein the information for generating the first common secret key includes a public key of each of the collaboration participants of the first common access interest group, and the information for generating the second common secret key includes a public key for each of the collaboration participants of the second common access interest group.

10. The computer program product of claim 7 wherein the first or second common access interest group and the first or second common secret key are updated upon a joining or leaving of a member thereof.

11. The computer program product of claim 10 wherein the updating is asynchronous in that each participant updates the first or second common secret key upon receipt of notification of the updating in conjunction with an access to the first or second document instance portion, and until then continues using the first or second common secret key.

12. The computer program product of claim 7 wherein the authority delegation information includes information allowing the accessing participant authority to update the first or second common access interest group upon a joining or leaving of a member thereof.

13. The computer program product of claim 7 wherein the first document instance portion is re-encrypted using the first common secret key once the first accessing is complete, and the second document instance portion is re-encrypted using the second common secret key once the second accessing is complete.

14. A computer-implemented-method of document collaboration that is performed by one or more processors, the computer method comprising:
 executing an access interest specification phase, including
  receiving access requests from collaboration participants for access to a document instance, the access requests specified using a document schema of the document instance and referencing at least one of a first schema portion for access to a first document instance portion and a second schema portion for access to a second document instance portion;
  determining a first common access interest group of the collaboration participants related to the first document instance portion and a second common access interest group of the collaboration participants related to the second document instance portion, based on the access requests, access credentials of the collaboration participants, and on an access control policy specified in terms of the access credentials;
  providing a first control data block to the participants of the first common access interest group, the first control data block including information for generating a first common secret key that is common to the participants of the first common access interest group,
  providing a second control data block to the participants of the second common access interest group, the second control data block including information for generating a second common secret key that is common to the participants of the second common access interest group, wherein at least one of the first and second control data blocks includes authority delegation information for authorizing a collaboration participant within a respective common access interest group to operate as a new to manage access control of a respective document instance portion, the authority delegation information including a chain of certificates including a certificate from an owner of at least a portion of the document instance that authorizes the collaboration participate to operate as the new authority; and
 executing a collaboration phase, including
  encrypting the first and second document instance portions using the access control policy;
  providing first access to the document instance for access to the first document instance portion by an accessing participant of the first common access interest group, the first access including decryption of the first document instance portion using the first common secret key;
  providing second access to the document instance for access to the second document instance portion by an accessing participant of the second common access interest, group, the second access including decryption of the second document instance portion using the second common secret key.

15. The computer method of claim 14 wherein each of the access requests are specified in terms of an access primitive describing a type of access requested for the first or second document instance portion.

16. The computer method of claim 14 wherein the access primitives include operations to view, append, delete, or rename the first or second document instance portion.

17. The computer method of claim 14 wherein the first or second common access interest group and the first or second common secret key are updated upon a joining or leaving of a member thereof.

* * * * *